US008279953B2

(12) United States Patent
Uesugi et al.

(10) Patent No.: US 8,279,953 B2
(45) Date of Patent: Oct. 2, 2012

(54) TRANSMITTING APPARATUS, RECEIVING APPARATUS, AND WIRELESS COMMUNICATION METHOD

(75) Inventors: Mitsuru Uesugi, Kanagawa (JP); Eiji Ota, Tokyo (JP); Atsushi Sumasu, Kanagawa (JP); Keisuke Ebiko, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1482 days.

(21) Appl. No.: 11/813,722

(22) PCT Filed: Dec. 27, 2005

(86) PCT No.: PCT/JP2005/023974
§ 371 (c)(1),
(2), (4) Date: Jul. 11, 2007

(87) PCT Pub. No.: WO2006/077729
PCT Pub. Date: Jul. 27, 2006

(65) Prior Publication Data
US 2009/0046787 A1      Feb. 19, 2009

(30) Foreign Application Priority Data

Jan. 20, 2005  (JP) ................................. 2005-013162
Feb. 25, 2005  (JP) ................................. 2005-051204
Mar. 15, 2005  (JP) ................................. 2005-073366

(51) Int. Cl.
*H04K 1/10*       (2006.01)
*H04L 27/28*      (2006.01)

(52) U.S. Cl. ...................................................... 375/260
(58) Field of Classification Search ................... 375/260
See application file for complete search history.

(56) References Cited

U.S. PATENT DOCUMENTS

| 7,002,900 B2 * | 2/2006 | Walton et al. ................. 370/208 |
| 2002/0037058 A1 | 3/2002 | Birru |
| 2004/0091057 A1 | 5/2004 | Yoshida |
| 2004/0125771 A1 * | 7/2004 | Subrahmanya ............... 370/332 |

(Continued)

FOREIGN PATENT DOCUMENTS

JP        07273741         10/1995

(Continued)

OTHER PUBLICATIONS

PCT International Search Report dated Apr. 11, 2006.

*Primary Examiner* — Kevin M. Burd
*Assistant Examiner* — Tanmay Shah
(74) *Attorney, Agent, or Firm* — Dickinson Wright PLLC

(57) ABSTRACT

A transmitting apparatus, a receiving apparatus and a wireless communication method for suppressing interference between codes, while further reducing the ratio of redundant components occupying a signal to improve the transmission efficiency. The transmitting apparatus (100) transmits a signal having a frame structure in which a plurality of symbols follow a pilot symbol to which a guard interval has been added. In the receiving apparatus (200) that receives that signal, a long FFT target section acquiring part (202) acquires, from the received OFDM signal, a long FFT target section that is a target section in which delay waves are to be removed by use of a pilot symbol. A long FFT part (203) performs a fast Fourier transformation of the long FFT target section to convert it to a frequency domain signal. A frequency equalizing part (204) performs a frequency equalization of the long FFT target section by use of an interpolation result of communication line estimation value. A long IFFT part (205) performs an inverse fast Fourier transformation of the long FFT target section as frequency equalized to convert it back to a time domain signal.

11 Claims, 19 Drawing Sheets

U.S. PATENT DOCUMENTS

| | | |
|---|---|---|
| 2004/0203476 A1 | 10/2004 | Liu |
| 2004/0259508 A1* | 12/2004 | Murakami et al. ............ 455/103 |
| 2005/0094550 A1* | 5/2005 | Huh et al. .................... 370/203 |

FOREIGN PATENT DOCUMENTS

| | | |
|---|---|---|
| JP | 11298434 | 10/1999 |
| JP | 2001292120 | 10/2001 |
| JP | 2003244094 | 8/2003 |
| JP | 2004503180 | 1/2004 |
| JP | 2004135305 | 4/2004 |
| JP | 2004208254 | 7/2004 |
| JP | 2004282182 | 10/2004 |

* cited by examiner

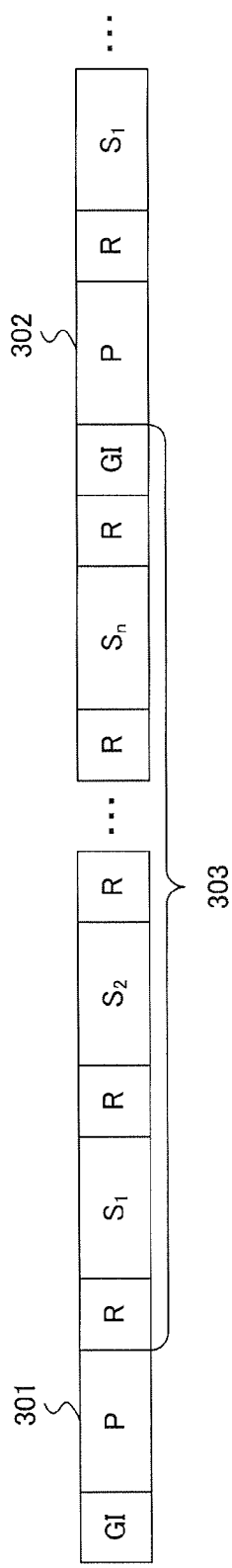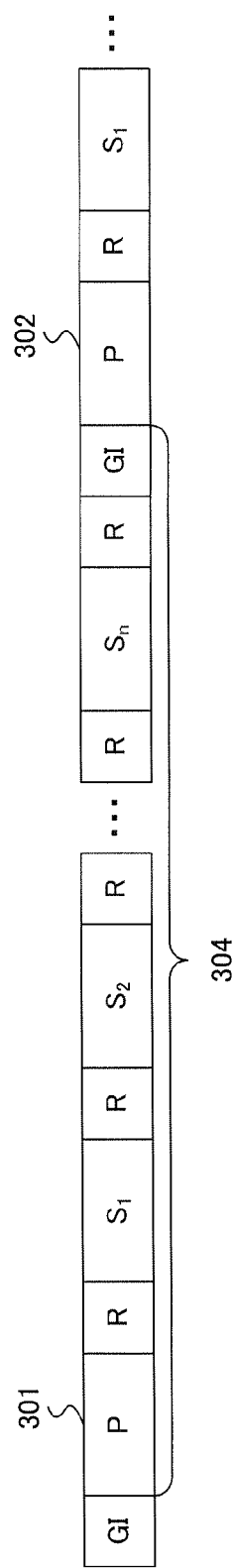
FIG.5A
FIG.5B

| | | GI LENGTH | | |
|---|---|---|---|---|
| | | 5 μs | 10 μs | 30 μs |
| FRAME LENGTH (THE NUMBER OF SAMPLES) | CONVENTIONAL | 4200 | 4350 | 4950 |
| | EMBODIMENT 1 | 3910 | 3920 | 3960 |
| OVERHEAD RATE | CONVENTIONAL | 14.6667% | 17.6092% | 27.5960% |
| | EMBODIMENT 1 | 8.3376% | 8.5714% | 9.4949% |

FIG.6

TRANSMITTING APPARATUS, RECEIVING APPARATUS, AND WIRELESS COMMUNICATION METHOD

TECHNICAL FIELD

The present invention relates to a transmitting apparatus, receiving apparatus and radio communication method, and more particularly, a transmitting apparatus, receiving apparatus and radio communication method used in a multipath environment.

BACKGROUND ART

In general, in radio communication of a multipath environment, the same signal is transmitted on a plurality of paths of different routes, and thereby, on the receiving side, a mixture of direct waves and delay waves is received. As a result, intersymbol interference which becomes an obstacle to development of high speed and wideband radio communication, occurs.

For suppressing intersymbol interference, the OFDM (Orthogonal Frequency Division Multiplexing) scheme and SC (Single Carrier) scheme, which are referred to as block transmission schemes, have attracted attention in recent years. In these schemes, as shown in FIG. 1, for example, guard intervals $GI_1$ to $GI_4$ are inserted between symbols $S_1$ to $S_4$ of the signal. Guard intervals $GI_1$ to $GI_4$ are replications of the end portions of symbols $S_1$ to $S_4$ that respectively follow, and therefore the end of each guard interval and head of each symbol become a consecutive waveform and have cyclicity.

In this way, by inserting guard intervals between all symbols, the receiving side can extract a symbol portion which is not influenced by intersymbol interference, and remove the influence of a multipath environment only through linear operation. At this time, the influence of longer delay waves can be ignored by making the guard interval long, and the effect of removing the influence of multipath environment increases.

On the other hand, the guard interval is a redundant component which does not include information to be transmitted, and therefore, from the viewpoint of transmission efficiency, it is preferable to make the guard interval as short as possible. Here, Patent Document 1, for example, discloses a technique of adjusting a guard interval length in an OFDM scheme to eliminate waste.

Patent Document 1: Japanese Patent Application Laid-open No. 2004-282182

DISCLOSURE OF THE INVENTION

Problems to be Solved by the Invention

However, guard intervals are arranged between all symbols to suppress intersymbol interference between symbols, and there is a problem that the reduction of a ratio of guard intervals in the overall signal is limited to a fixed degree. That is, in order to reduce the influence of delay waves of a given symbol to the next symbol, guard intervals must be arranged between all symbols, and, as a result, the overall signal includes a fixed or larger amount of redundant components.

It is therefore an object of the present invention to provide a transmitting apparatus, receiving apparatus and radio communication method capable of suppressing intersymbol interference, further reducing the ratio of redundant components in a signal and improving the transmission efficiency.

Means for Solving the Problem

The transmitting apparatus according to the present invention employs a configuration having: a first generating section that generates a plurality of information symbols from information data; a second generating section that generates a pilot symbol from pilot data of a known and invariant pattern; an adding section that adds a guard interval only immediately before the pilot symbol; and a transmitting section that transmits a signal having a frame configuration where the plurality of information symbols follow a pilot symbol to which a guard interval is added.

According to this configuration, a guard interval is added only to the pilot symbol, and a signal having a frame configuration where a guard interval is not added to information symbols is transmitted, so that it is possible to further reduce the ratio of redundant components in the signal and improve the transmission efficiency. Further, channel estimation and frequency equalization can be performed using a pilot symbol on the receiving side, so that it is possible to remove delay waves and suppress intersymbol interference even without guard intervals.

The receiving apparatus according to the present invention employs a configuration having: a receiving section that receives a signal having a frame configuration where a plurality of information symbols follow a pilot symbol comprised of pilot data of a known and invariant pattern; a calculating section that calculates a channel estimation value of each frequency corresponding to a time length which is equal to or longer than the pilot segment using a pilot segment corresponding to the pilot symbol; and a removing section that removes delay waves included in information symbol segments corresponding to the plurality of information symbols using calculated channel estimation values.

According to this configuration, delay waves are removed by performing channel estimation using a pilot symbol and obtaining channel estimation values for the information symbol segment, so that it is possible to suppress intersymbol interference even without guard intervals. Further, on the transmitting side, it is not necessary to add guard intervals, so that it is possible to further reduce the ratio of redundant components in a signal and improve the transmission efficiency.

The radio communication system according to the present invention has a transmitting apparatus and a receiving apparatus, wherein: the transmitting apparatus has: a first generating section that generates a plurality of information symbols from information data; a second generating section that generates a pilot symbol from pilot data of a known and invariant pattern; and a transmitting section that transmits a signal having a frame configuration where the plurality of information symbols follow the pilot symbol; and the receiving apparatus has: a receiving section that receives a signal having the frame configuration; an estimating section that performs channel estimation using a pilot segment corresponding to the pilot symbol; an interpolating section that interpolates the channel estimation results on a frequency axis and obtains channel estimation values; and a removing section that removes delay waves included in information symbol segments corresponding to the plurality of information symbols using the obtained channel estimation values.

The radio communication method according to the present invention is a radio communication method of a radio communication system having a transmitting apparatus and a receiving apparatus, the radio communication method has the steps of: at the transmitting apparatus: generating a plurality of information symbols from information data; generating a pilot symbol from pilot data of a known and invariant pattern; and transmitting a signal having a frame configuration where the plurality of information symbols follow the pilot symbol; and at the receiving apparatus: receiving a signal having the frame configuration; performing channel estimation using a pilot segment corresponding to the pilot symbol; interpolating the channel estimation results on a frequency axis and obtaining channel estimation values; and removing delay waves included in information symbol segments corresponding to the plurality of information symbols using the obtained channel estimation values.

According to the above, the transmitting apparatus transmits a signal having a frame configuration where a plurality of information symbols follow a pilot symbol, and a receiving apparatus obtains channel estimation values for an information symbol segment located between pilot symbols through interpolation and removes delay waves, so that it is possible to suppress intersymbol interference even without guard intervals, further reduce the ratio of redundant components in a signal and improve the transmission efficiency without adding guard intervals.

Advantageous Effect of the Invention

According to the present invention, it is possible to suppress intersymbol interference, further reduce the ratio of redundant components in a signal and improve the transmission efficiency.

BRIEF DESCRIPTION OF DRAWINGS

FIG. 5A shows an example of a long FFT target segment according to Embodiment 1;

FIG. 5B shows another example of a long FFT target segment according to Embodiment 1;

FIG. 6 shows a comparison result of the redundant components of a signal;

BEST MODE FOR CARRYING OUT THE INVENTION

Now, embodiments of the present invention will be described in detail with reference to the accompanying drawings.

Embodiment 1

Features of Embodiment 1 of the present invention include, in an OFDM scheme, periodically inserting the same pilot symbol every plurality of information symbols and adding guard intervals only to the pilot symbols.

Figure 1:
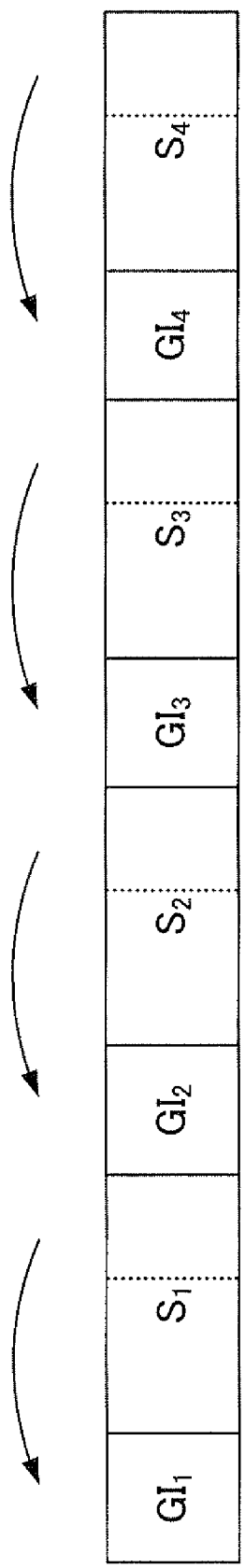
FIG. 1 shows an example of a signal in which guard intervals are inserted.
Figure 2:
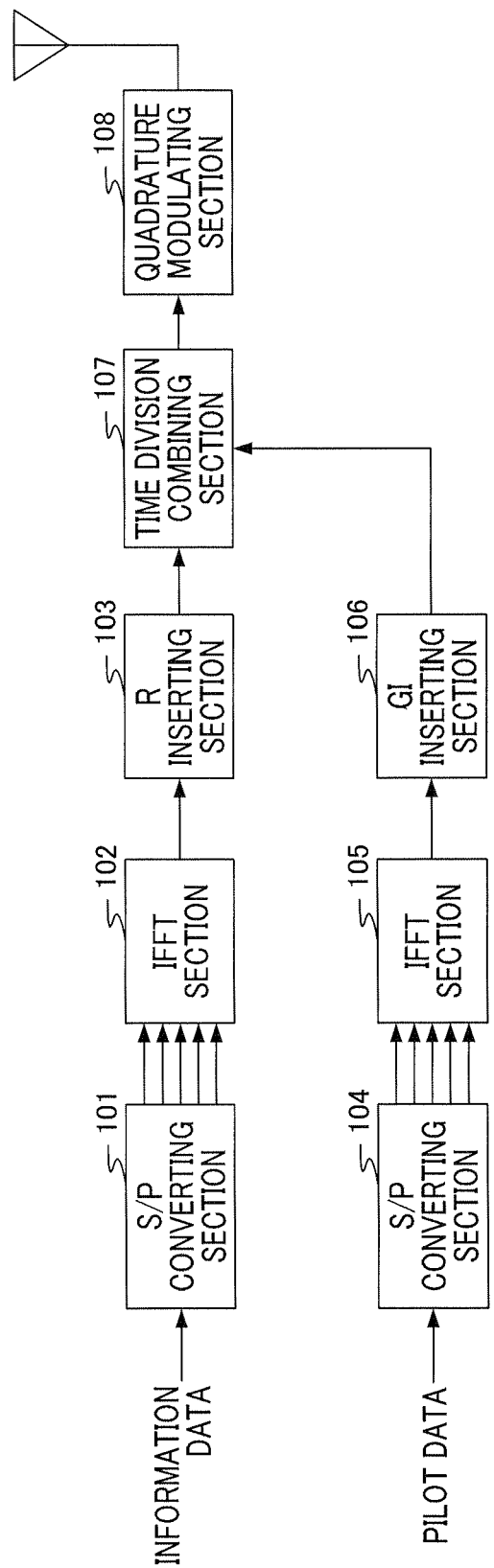
FIG. 2 is a block diagram showing the configuration of the main part of a transmitting apparatus according to Embodiment 1 of the present invention.

FIG. 2 is a block diagram showing the configuration of the main part of a transmitting apparatus according to Embodiment 1. The transmitting apparatus shown in FIG. 2 has S/P (Serial/Parallel) converting section 101, IFFT (Inverse Fast Fourier Transform) section 102, R (Ramp) inserting section 103, S/P converting section 104, IFFT section 105, GI (Guard Interval) inserting section 106, time division combining section 107 and quadrature modulating section 108.

S/P converting section 101 performs S/P conversion on information data and outputs the parallel data corresponding to the number of subcarriers to IFFT section 102.

IFFT section 102 assigns the parallel data to subcarriers whose frequencies are orthogonal each other, performs inverse fast Fourier transformation and P/S conversion, and outputs the obtained time domain information symbols to R inserting section 103.

R inserting section 103 inserts a ramping segment whose amplitude gradually increases and decreases, at the head and end of the information symbols, and suppresses discontinuity of the waveform with the previous and next symbols.

S/P converting section 104 performs S/P conversion on the pilot data of a known and invariant pattern, and outputs the parallel data corresponding to the number of subcarriers to IFFT section 105.

IFFT section 105 assigns the parallel data to subcarriers whose frequencies are orthogonal each other, performs inverse fast Fourier transformation and P/S conversion, and outputs the obtained time domain pilot symbol to GI inserting section 106.

GI inserting section 106 replicates the end portion of the pilot symbol at the head and inserts a guard interval. This guard interval may include a ramping segment, similar to the information symbols.

Time division combining section 107 switches by time division between the output from R inserting section 103 and the output from GI inserting section 106 to quadrature modulating section 108, and determines the temporal arrangement of the information symbols and pilot symbol. At this time, time division combining section 107 first outputs one pilot symbol from GI inserting section 106, then outputs a plurality of information symbols from R inserting section 103, and subsequently, sequentially outputs one pilot symbol and a plurality of information symbols.

Quadrature modulating section 108 modulates an OFDM signal having one pilot symbol and a plurality of information symbols outputted from time division combining section 107 in a single frame, to a radio frequency band, and transmits the result via an antenna.

Figure 3:
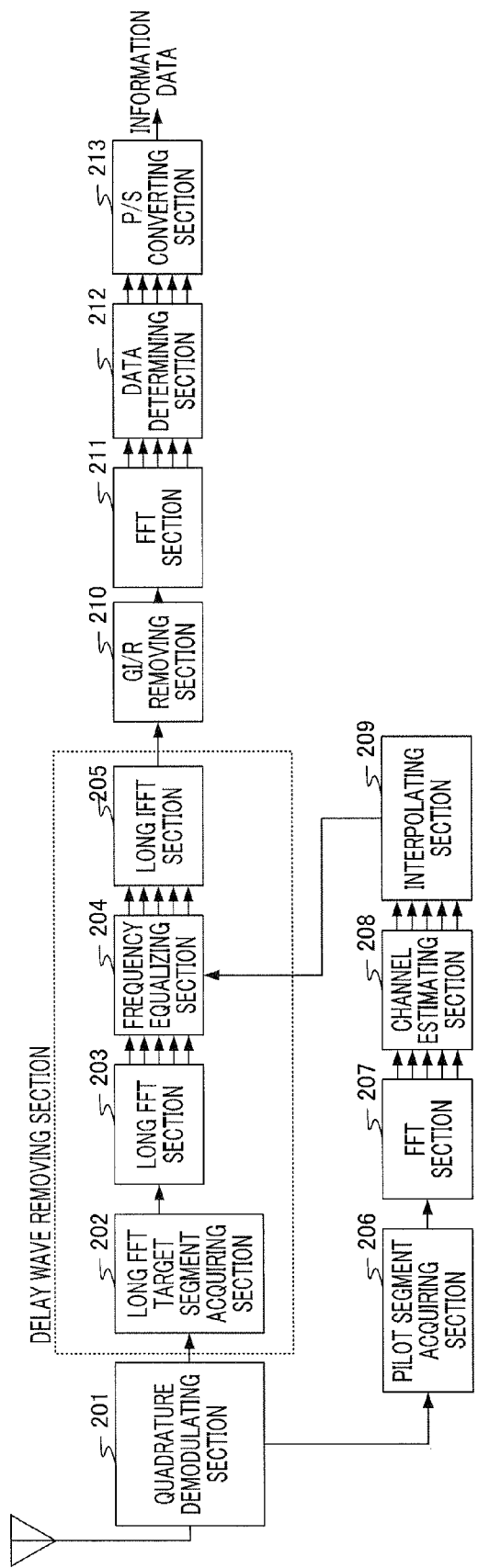
FIG. 3 is a block diagram showing the configuration of the main part of a receiving apparatus according to Embodiment 1.

FIG. 3 is a block diagram showing the configuration of the main part of a receiving apparatus according to Embodiment 1. The receiving apparatus shown in FIG. 3 has quadrature demodulating section 201, long FFT (Fast Fourier Transform) target segment acquiring section 202, long FFT section 203, frequency equalizing section 204, long IFFT section 205, pilot segment acquiring section 206, FFT section 207, channel estimating section 208, interpolating section 209, GI/R removing section 210, FFT section 211, data determining section 212 and P/S (Parallel/Serial) converting section 213.

Quadrature demodulating section 201 receives an OFDM signal via the antenna and demodulates the signal to a baseband.

Long FFT target segment acquiring section 202 acquires from the received OFDM signal a long FFT target segment from which delay waves are to be removed using a pilot symbol. Specifically, long FFT target segment acquiring section 202 acquires a segment from an information symbol including a ramping segment immediately after a given pilot symbol to a guard interval inserted at the head of the next pilot symbol, as a long FFT target segment. Furthermore, long FFT target segment acquiring section 202 may acquire a segment from a given pilot symbol to a guard interval inserted at the head of the next pilot symbol, as a long FFT target segment.

Long FFT section 203 performs fast Fourier transformation on the long FFT target segment and transforms a time domain signal to a frequency domain signal.

Frequency equalizing section 204 performs frequency equalization on the long FFT target segment using an interpolation result of channel estimation values described later, and removes the frequency components corresponding to delay waves.

Long IFFT section 205 performs inverse fast Fourier transformation and P/S conversion on the long FFT target segment after frequency equalization, and transforms the frequency domain signal to a time domain signal which is similar to the received OFDM signal.

The above-described long FFT target segment acquiring section 202, long FFT section 203, frequency equalizing section 204 and long IFFT section 205 configure a delay wave removing section. That is, even without guard intervals between information symbols, frequency equalization is performed on a long FFT target segment, and frequency components corresponding to delay waves are removed, and thereby intersymbol interference is suppressed.

Pilot segment acquiring section 206 acquires a pilot segment corresponding to the pilot symbol from the received OFDM signal.

FFT section 207 performs fast Fourier transformation (or discrete Fourier transformation) on the acquired pilot segment and transforms a time domain signal to a frequency domain signal.

Channel estimating section 208 performs channel estimation of each subcarrier using the pilot segment transformed to a frequency domain signal, and outputs the acquired channel estimation values to interpolating section 209.

Interpolating section 209 interpolates the channel estimation values acquired from the pilot segment on the frequency axis using an interpolation algorithm such as, for example, spline interpolation and linear interpolation. Furthermore, the interpolation result of the channel estimation values acquired here is used in frequency equalization of the above-described frequency equalizing section 204. When fast Fourier transformation is performed on a pilot segment, the frequency components corresponding to the number of samples which corresponds to one symbol in the band equivalent to the sampling frequency are acquired, but, when fast Fourier transformation is performed on a long FFT target segment, a larger number of frequency components exist in the same band. As a result, when frequency equalization is performed, it is necessary to acquire finer channel estimation values on the frequency axis by interpolating the channel estimation values of the pilot segment.

GI/R removing section 210 removes the guard intervals and ramping segments from the long FFT target segment from which delay waves are removed by the above-described delay wave removing section.

FFT section 211 performs fast Fourier transformation on each of the information symbols obtained by removing guard intervals and ramping segments, and acquires data of each subcarrier from each of the information symbols.

Data determining section 212 determines the data on a per subcarrier basis for each information symbol, and outputs the information data assigned to each subcarrier in parallel to P/S converting section 213.

P/S converting section 213 performs P/S conversion on the information data assigned to each subcarrier, and outputs serial information data.

Next, the operation of the transmitting apparatus and receiving apparatus configured as described above will be described with reference to FIG. 4 and FIG. 5.

First, pilot data is S/P converted to parallel data corresponding to the number of subcarriers by S/P converting section 104 of the transmitting apparatus, and the parallel data is assigned to each subcarrier and subjected to inverse fast Fourier transformation by IFFT section 105. As a result, the pilot symbol shown in FIG. 4 (indicated by "P" in the figure) is generated, and the end portion of the pilot symbol is replicated at the head, and a guard interval (indicated by "GI" in the figure) is inserted by GI inserting section 106. The pilot symbol is a known signal for both the transmitting apparatus shown in FIG. 2 and the receiving apparatus shown in FIG. 3. Further, the pilot symbol may be any signal that can be used for channel estimation, and here, is an OFDM modulated signal as described above.

Here, it is preferable to determine the length of the guard interval inserted at the head of a pilot symbol as follows. That is, in this embodiment, the segment from the information symbol including a ramping segment immediately after a given pilot symbol to a guard interval inserted at the head of the next pilot symbol is used as a long FFT target segment, and fast Fourier transformation is performed on this segment.

However, it is preferable to determine the guard interval length so that, when the long FFT target segment is taken as the number of samples in fast Fourier transformation, the number of samples becomes a power of two (or an integral multiple thereof). Specifically, for example, if it is assumed that there are 256 samples of pilot symbols and information symbols and four samples of ramping segments, GI inserting section 106 preferably determines the length of the guard interval so that (256+4)×(n+1)+(number of samples of guard interval length) is a power of two (or an integral multiple thereof). As a result, it is possible to efficiently perform frequency equalization of the long FFT target segment. Particularly, when the number of samples of a long FFT target segment is an integral multiple of the number of samples of one symbol, the fast Fourier transformation performed on the long FFT target segment can be readily achieved by combining (or repeatedly using) a plurality of normal fast Fourier transformation circuits for one symbol, so that it is possible to reduce the circuit scale.

On the other hand, the information data are S/P converted to parallel data corresponding to the number of subcarriers by S/P converting section 101 of the transmitting apparatus and subjected to inverse fast Fourier transformation by IFFT section 102 so that the parallel data is assigned to each subcarrier. As a result, the information symbols shown in FIG. 4 (indicated by "$S_1$" to "$S_n$" in the figure) are generated, and a ramping segment (indicated by "R" in the figure) is inserted between information symbols by R inserting section 103. In this embodiment, a guard interval is not inserted between information symbols, so that it is possible to significantly reduce the ratio of redundant components in the overall signal. Furthermore, compared to the guard interval length, the length of the ramping segment is vanishingly short, and therefore does not increase the ratio of redundant components in the overall signal.

Figure 4:
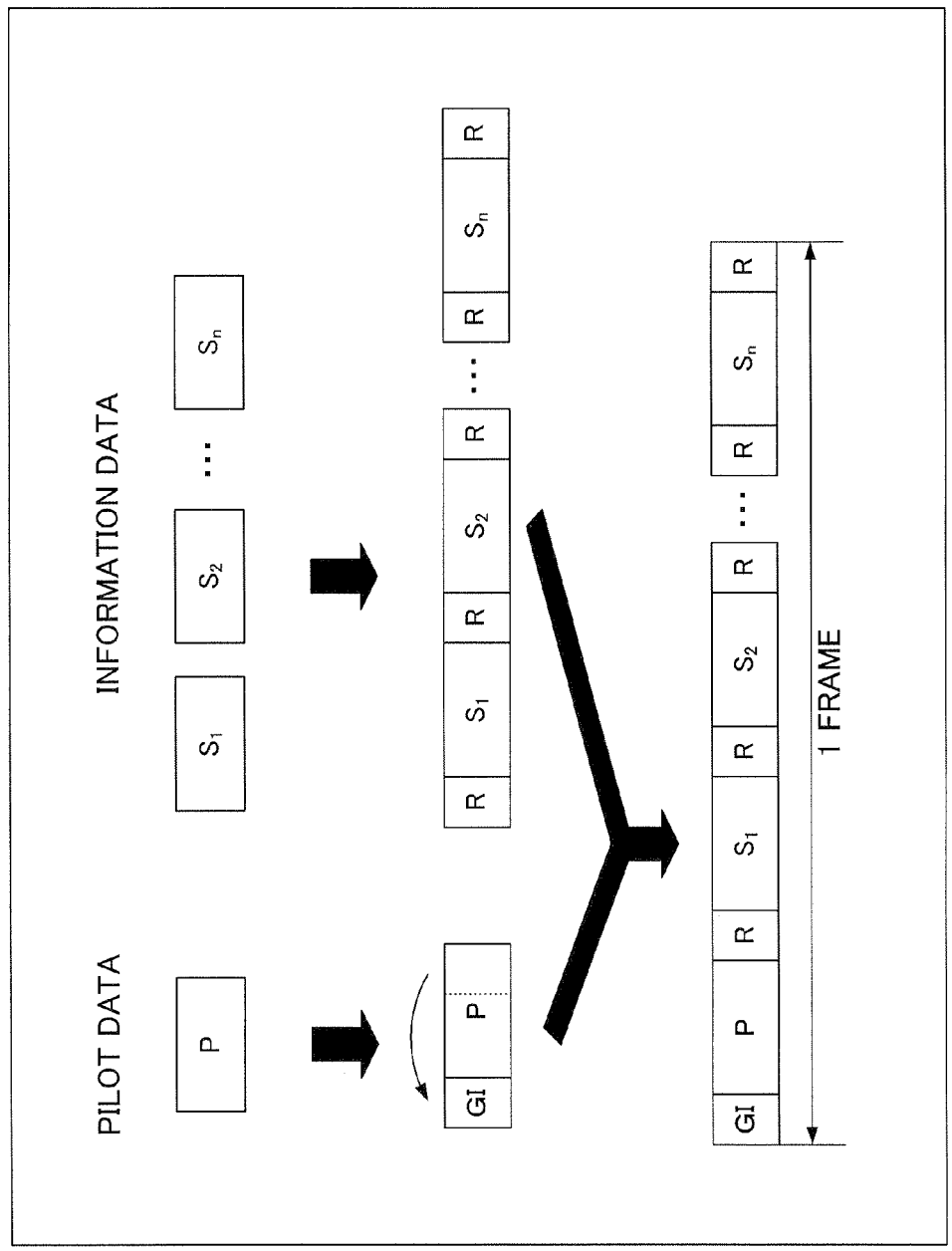
FIG. 4 shows a configuration example of a transmission signal according to Embodiment 1.

The pilot symbol in which a guard interval is inserted and the information symbols in which ramping segments are inserted are outputted while switching the input to time division combining section 107, and thereby the symbols are outputted to quadrature modulating section 108 as an OFDM signal having a frame configuration as shown at the bottom of FIG. 4.

Then, the OFDM signal is modulated to a radio frequency band and transmitted via an antenna by quadrature modulating section 108.

The transmitted OFDM signal is received by the antenna of the receiving apparatus and demodulated to a baseband by quadrature demodulating section 201. Then, pilot segment acquiring section 206 acquires a signal of a pilot segment corresponding to a pilot symbol (hereinafter simply referred to as "pilot segment") from the OFDM signal demodulated to a baseband.

FFT section 207 performs fast Fourier transformation on the acquired pilot segment and outputs the data of each subcarrier to channel estimating section 208. Then, channel estimating section 208 estimates fluctuation on the channel of each subcarrier corresponding to the pilot symbol and obtains a channel estimation value of each subcarrier. Specifically, if a transmission signal transmitted as a pilot symbol is assumed to be x, and a received signal received after transmission signal x is influenced by fading is assumed to be y, signal X before inverse fast Fourier transformation of transmission signal x and signal Y after fast Fourier transformation of received signal y have the relationship indicated by the following equation 1:

$$Y = H \cdot X \quad \text{(Equation 1)}$$

In addition, H in equation 1 indicates a channel estimation value. Therefore, a channel estimation value can be obtained by dividing the fast Fourier transformation result (equivalent to Y in equation 1) of an actual received signal by known pilot data (equivalent to X of equation 1).

A channel estimation value of each subcarrier of the pilot symbol is outputted to interpolating section 209, and fine channel estimation values in the frequency domain are obtained through interpolation (such as spline interpolation and linear interpolation). The channel estimation values obtained through interpolation are outputted to frequency equalizing section 204.

On the other hand, long FFT target segment acquiring section 202 acquires a long FFT target segment from which the delay wave is to be removed through frequency equalization, from the OFDM signal. Specifically, as shown in FIG. 5A, segment 303 between pilot symbol 301 of a given frame and pilot symbol 302 of the next frame is acquired as a long FFT target segment. Furthermore, as described above, when the length of the long FFT target segment is taken as the number of samples in fast Fourier transformation, the number of samples is preferably a power of two.

As shown in FIG. 5B, segment 304 including pilot symbol 301 may be acquired as a long FFT target segment. Therefore, if either segment 303 or segment 304 has a length equivalent to the above-described number of samples of a power of two (or integral multiple thereof), the segment may be set as a long FFT target segment. Here, pilot symbols 301 and 302 shown in FIG. 5A and FIG. 5B are the same as the pilot symbol included in the pilot segment acquired by pilot segment acquiring section 206.

Then, long FFT section 203 performs fast Fourier transformation on the long FFT target segment and transforms a time domain signal to a frequency domain signal. In this embodiment, guard intervals are not inserted between information symbols, and therefore delay waves exist in the signal at this time, and frequency components corresponding to the delay waves are included also in the frequency domain signal.

The signal after fast Fourier transformation is outputted to frequency equalizing section 204 and subjected to frequency equalization using the channel estimation value of each subcarrier outputted from interpolating section 209. Specifically, signal X' from which the fading influence is removed is obtained from signal Y' after fast Fourier transformation and channel estimation value H' obtained through interpolation by interpolating section 209, using the following equation 2:

$$X' = Y'/H' \quad \text{(Equation 2)}$$

Signal X' from which the frequency components corresponding to the delay waves are removed in this way is transformed to a time domain signal again by long IFFT section 205. Delay waves do not exist in the signal at this time, and therefore it is possible to suppress intersymbol interference even without guard intervals.

Then, GI/R removing section 210 removes the guard intervals and ramping segments from the long FFT target segment after delay waves are removed outputted from long IFFT section 205 and outputs only the information symbols to FFT section 211. The information symbols are subjected to fast Fourier transformation by FFT section 211 on a per symbol basis, and the data of each subcarrier is acquired. Then, the data of each subcarrier is determined by data determining section 212, and the obtained parallel information data is converted to serial information data and outputted by P/S converting section 213.

In this way, even if guard intervals are not inserted between information symbols, it is possible to suppress intersymbol interference by removing delay waves and improve transmission efficiency as shown in FIG. 6. FIG. 6 is a chart that compares the frame length and overhead rate for the case where the guard interval length is changed, between the conventional scheme of inserting guard intervals between information symbols and the scheme of Embodiment 1 that does not insert guard intervals between symbols. The values in the figure are merely examples (it is assumed that the parameters have a 500 $n_s$ sampling frequency, 256 sample symbol length, 4 sample ramp length and 14 information symbols in one frame). As shown in the figure, when the guard interval length is 5 μs, the frame length is 4200 samples of fast Fourier transformation in the conventional scheme and 3910 samples in the scheme of Embodiment 1. Then, the overhead rate that indicates the ratio of redundant components is about 15% in the conventional scheme and kept to about 8% in the scheme of Embodiment 1. Furthermore, if a guard interval length is 30 $\mu_s$, a threefold difference occurs in the overhead rate.

As described above, according to this embodiment, the transmitting apparatus transmits data without adding guard intervals between information symbols, but by periodically inserting the same known pilot symbol and adding a guard interval only to the pilot symbol. Further, the receiving apparatus obtains the channel estimation values of information symbols using the pilot symbol, performs frequency equalization on the information symbols and removes delay waves. As a result, it is possible to suppress intersymbol interference, further reduce the ratio of redundant components in a signal and improve the transmission efficiency.

Furthermore, although a guard interval is inserted only at the head of the pilot symbol in this embodiment, a guard interval does not have to be inserted in the pilot symbol. That is, when the same known pilot symbol is periodically inserted between information symbols, frequency equalization can be performed at the receiving apparatus, so that it is possible to suppress intersymbol interference even without guard intervals. However, by inserting a guard interval at the head of the pilot symbol, it is possible to prevent channel estimation accuracy from decreasing due to intersymbol interference with respect to the pilot symbol.

Embodiment 2

Features of Embodiment 2 of the present invention include, in an SC scheme, periodically inserting the same pilot symbol sequence every plurality of information symbols and adding guard intervals only to the pilot symbol sequences.

The configuration of the transmitting apparatus according to Embodiment 2 is a configuration where S/P converting sections 101 and 104, IFFT sections 102 and 105, and R inserting section 103 according to an OFDM scheme are removed from the transmitting apparatus according to Embodiment 1 (FIG. 2), and the configuration of each processing section is the same as that of Embodiment 1, and descriptions thereof will be omitted. However, in this embodiment, the guard interval is formed by replicating a predetermined number of symbols of the end of the pilot symbol at the head of a pilot symbol, and the signal having the frame configuration where an information symbol sequence follows a pilot symbol sequence is subjected to band limitation by a filter or the like and transmitted from the transmitting apparatus.

Figure 7:
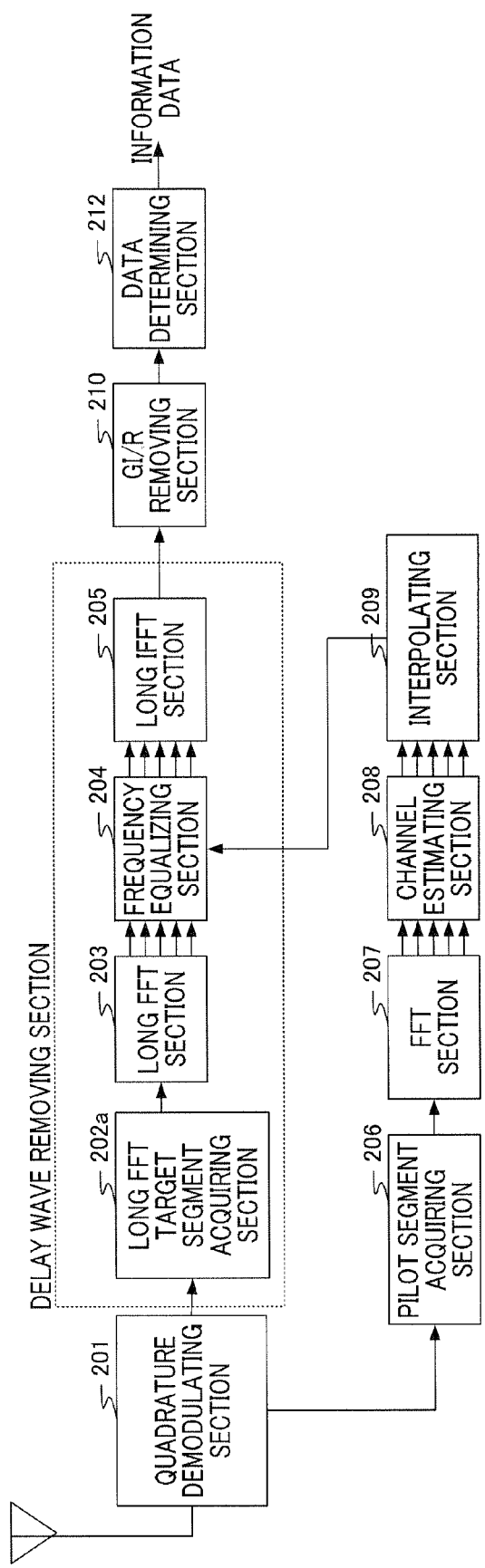
FIG. 7 is a block diagram showing the configuration of the main part of a receiving apparatus according to Embodiment 2 of the present invention.

FIG. 7 is a block diagram showing the configuration of the main part of a receiving apparatus according to Embodiment 2. In FIG. 7, the parts that are the same as those in FIG. 3 will be assigned the same reference numerals without further explanations. The receiving apparatus shown in FIG. 7 has quadrature demodulating section 201, long FFT target segment acquiring section 202a, long FFT section 203, frequency equalizing section 204, long IFFT section 205, pilot segment acquiring section 206, FFT section 207, channel estimating section 208, interpolating section 209, GI/R removing section 210 and data determining section 212.

Long FFT target segment acquiring section 202a acquires from a received signal a long FFT target segment from which delay waves are to be removed using pilot symbols. Specifically, long FFT target segment acquiring section 202a acquires an information symbol sequence immediately after a given pilot symbol sequence and a guard interval inserted at the head of the next pilot symbol sequence, as a long FFT target segment. Furthermore, long FFT target segment acquiring section 202a may acquire a segment from a given pilot symbol sequence to the guard interval inserted at the head of the next pilot symbol sequence, as a long FFT target segment.

Next, the operation of the transmitting apparatus and receiving apparatus configured as described above will be described with reference to FIG. 8 and FIG. 9.

Figure 8:
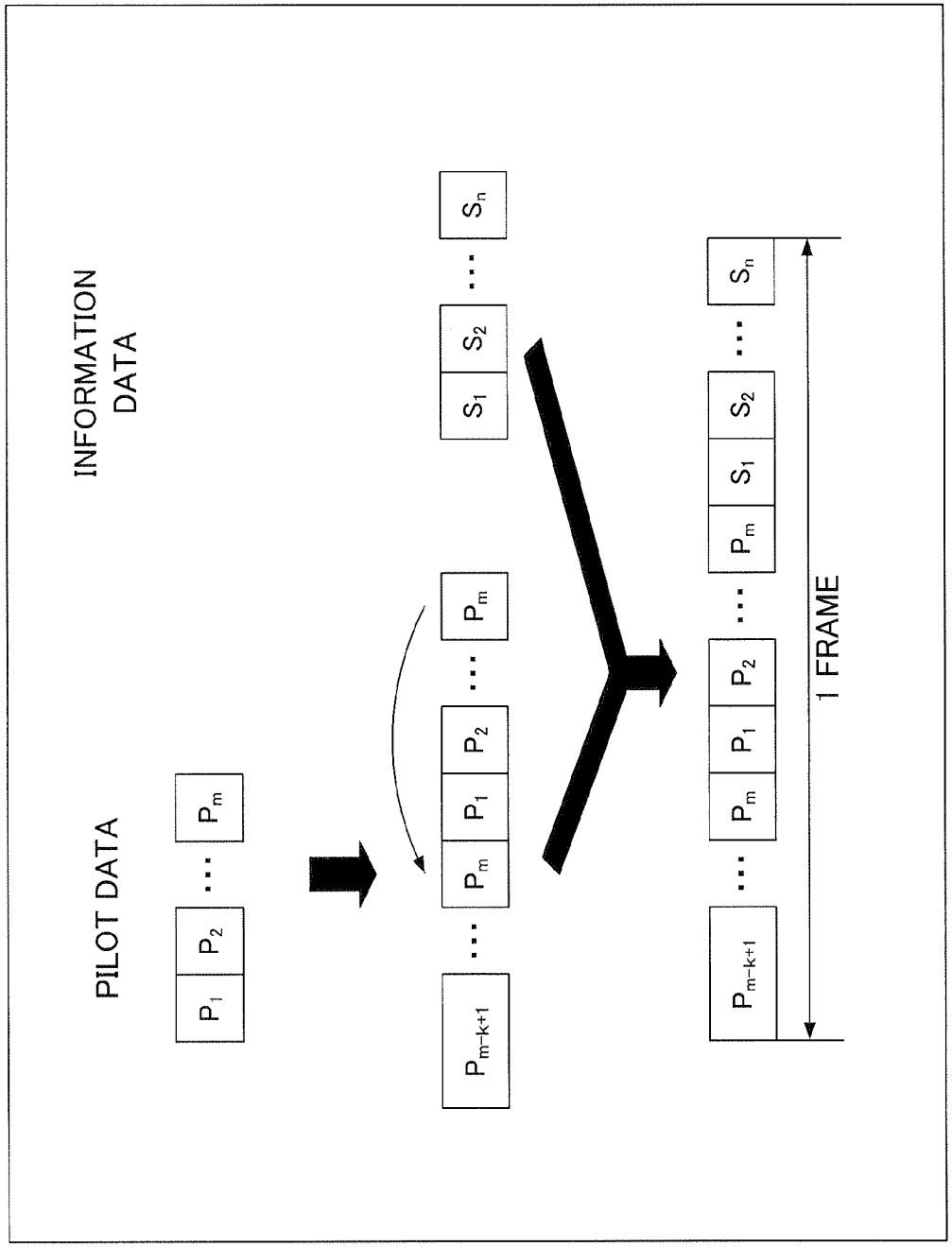
FIG. 8 shows a configuration example of a transmission signal according to Embodiment 2.

First, pilot data are modulated using a modulation scheme such as QPSK and 16QAM, for example, to obtain m pilot symbol sequences (indicated by "$P_1$" to "$P_m$" in the figure) shown in FIG. 8, and the end k (k<m) pilot symbols ("$P_{m-k+1}$" to "$P_m$" symbols in the figure) are replicated at the head as guard intervals. A pilot symbol sequence is a known signal for both the transmitting apparatus and receiving apparatus. Further, a pilot symbol sequence may be any signal that can be used for channel estimation, and, here, is a signal modulated using the modulation scheme as described above.

On the other hand, information data has n information symbol sequences ("$S_1$" to "$S_n$") shown in FIG. 8. In this embodiment, a guard interval is not inserted at the head of the information symbol sequence, so that it is possible to significantly reduce the ratio of redundant components in the overall signal. Further, a ramping segment may be inserted between information symbols as necessary.

The pilot symbol sequence in which a guard interval is inserted and information symbol sequence in which a guard interval is not inserted are transmitted as a signal having a frame configuration as shown at the bottom of FIG. 8.

The transmitted signal is received by the antenna of the receiving apparatus and demodulated to a baseband by quadrature demodulating section 201. Then, pilot segment acquiring section 206 acquires a pilot segment corresponding to the pilot symbol sequence from the received signal converted to a baseband.

FFT section 207 performs fast Fourier transformation on the acquired pilot segment and outputs each frequency component of the pilot symbol sequence to channel estimating section 208. Then, channel estimating section 208 obtains a channel estimation value of each frequency component of the pilot symbol sequence. The channel estimation value of the pilot symbol sequence is outputted to interpolating section 209, and fine channel estimation values in the frequency domain are obtained through interpolation (such as spline interpolation and linear interpolation). The channel estimation values obtained through interpolation are outputted to frequency equalizing section 204.

Figure 9:
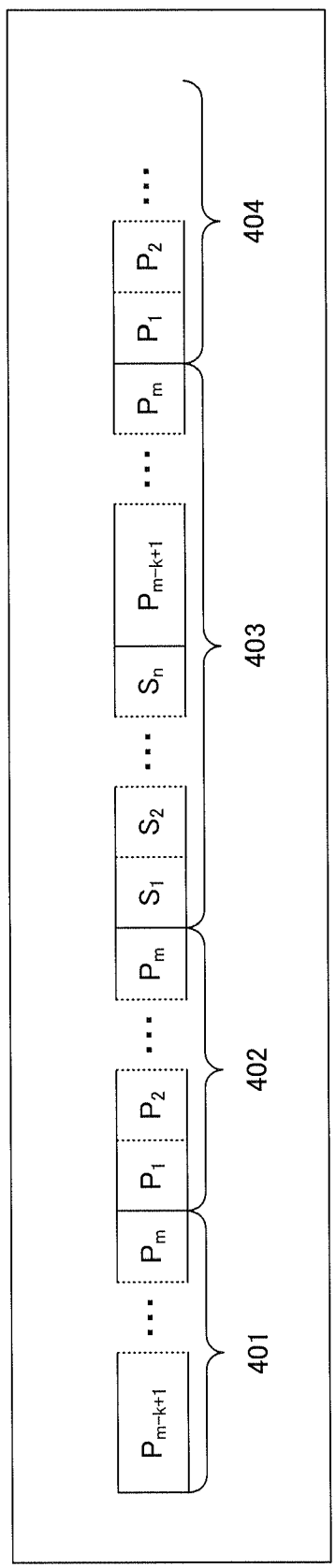
FIG. 9 shows an example of a long FFT target segment according to Embodiment 2.

On the other hand, long FFT target segment acquiring section 202a acquires the long FFT target segment from which delay waves are to be removed through frequency equalization, from the received signal. Specifically, as shown in FIG. 9, segment 403 between pilot symbol sequence 402 following guard interval 401 of a given frame and pilot symbol sequence 404 of the next frame is acquired as a long FFT target segment. This segment 403 includes information symbol sequences ("$S_1$" to "$S_n$" in the figure) and guard intervals ("$P_{m-k+1}$" to "$P_m$" in the figure) of the next frame.

Further, a segment combining pilot symbol sequence 402 and segment 403 in FIG. 9 may be acquired as a long FFT target segment. Here, pilot symbol sequences 402 and 404 shown in FIG. 9 are the same as the pilot symbol sequence acquired by pilot segment acquiring section 206.

Then, long FFT section 203 performs fast Fourier transformation on the long FFT target segment and transforms a time domain signal to a frequency domain signal. In this embodiment, a guard interval is not inserted at the head of the information symbol sequence, and therefore delay waves exist in the signal at this time, and frequency components corresponding to the delay waves are included also in the frequency domain signal.

The signal after fast Fourier transformation is outputted to frequency equalizing section 204 and subjected to frequency equalization using the channel estimation values outputted from interpolating section 209. The signal from which the frequency components corresponding to delay waves are removed through frequency equalization is transformed to a time domain signal again by long IFFT section 205. Delay waves do not exist in the signal at this time, so that it is possible to suppress intersymbol interference even without guard intervals.

Then, GI/R removing section 210 removes guard intervals (that is, "$P_{m-k+1}$" to "$P_m$" of segment 403 in FIG. 9) and a ramping segment (if inserted) from the long FFT target segment after delay waves are removed outputted from long IFFT section 205 and outputs only the information symbols (that is, "$S_1$" to "$S_n$" of segment 403 in FIG. 9) to data determining section 212. Then, data determining section 212 performs data determination.

As described above, according to this embodiment, the transmitting apparatus transmits data without adding guard intervals between information symbols, but by periodically inserting the same known pilot symbol sequence and adding guard intervals only to the pilot symbol sequences. Further, the receiving apparatus obtains channel estimation values of the information symbol sequence using a pilot symbol sequence, performs frequency equalization on the information symbol sequence, and removes delay waves. As a result, also in an SC scheme, it is possible to suppress intersymbol interference, further reduce the ratio of redundant components in a signal and improve the transmission efficiency.

Furthermore, in this embodiment, a guard interval is inserted only at the head of a pilot symbol sequence, but a guard interval does not have to be inserted in the pilot symbol sequence. That is, when the same known pilot symbol sequence is periodically inserted between information symbol sequences, frequency equalization can be performed at the receiving apparatus, so that it is possible to suppress intersymbol interference even without guard intervals. However, by inserting a guard interval at the head of the pilot symbol sequence, it is possible to prevent channel estimation accuracy from decreasing due to intersymbol interference with respect to the pilot symbol sequence.

Embodiment 3

Features of Embodiment 3 of the present invention include obtaining fine channel estimation values on the frequency axis not by interpolating the channel estimation values on the frequency axis on the receiving side, but by creating a delay profile corresponding to the overall long FFT target segment from the channel estimation values and performing quadrature transformation.

In Embodiments 1 and 2, interpolating section 209 of the receiving apparatus interpolates channel estimation values, and it is thereby possible to obtain fine channel estimation values on the frequency axis. In this case, "fine channel estimation values on the frequency axis" specifically refers to the channel estimation values corresponding to the number of samples which correspond to the long FFT target segment in the bandwidth used for communication. That is, in the frame configuration shown in FIG. 5B, for example, when the number of samples of a combination of one symbol and one ramping segment is assumed to be N, and the number of samples of a guard interval is assumed to be $N_{GI}$, long FFT target segment 304 corresponds to $[N \times (n+1)+N_{GI}]$ samples. Therefore, for example, as in Embodiment 1, when an OFDM scheme is applied, the channel estimation values corresponding to $[N \times (n+1)+N_{GI}]$ samples in the band where the subcarriers exist are required for frequency equalization.

Figure 10A:
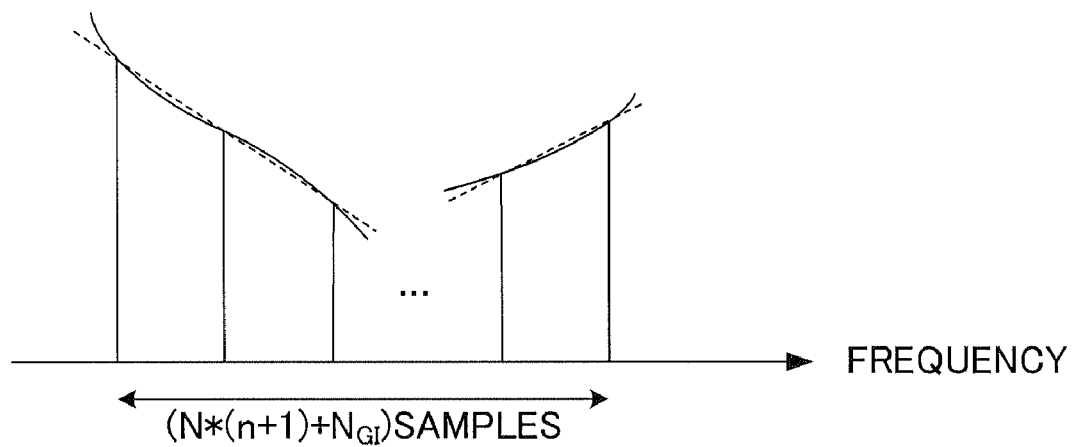
FIG. 10A shows an example of actual channel conditions and channel estimation values.

Then, the values actually calculated by channel estimating section 208 are the channel estimation values corresponding to N samples which correspond to the pilot symbol, and therefore the channel estimation values corresponding to $[N \times (n+1)+N_{GI}]$ samples are obtained through interpolation as described above. When the channel estimation values are obtained through interpolation in this way, as shown in FIG. 10A, for example, if the frequency selectivity of the actual channel fluctuation value indicated by the solid line is small, a difference between the channel estimation value obtained through interpolation indicated by the dashed line and the actual channel fluctuation value is small, and therefore the accuracy of frequency equalization does not deteriorate.

Figure 10B:
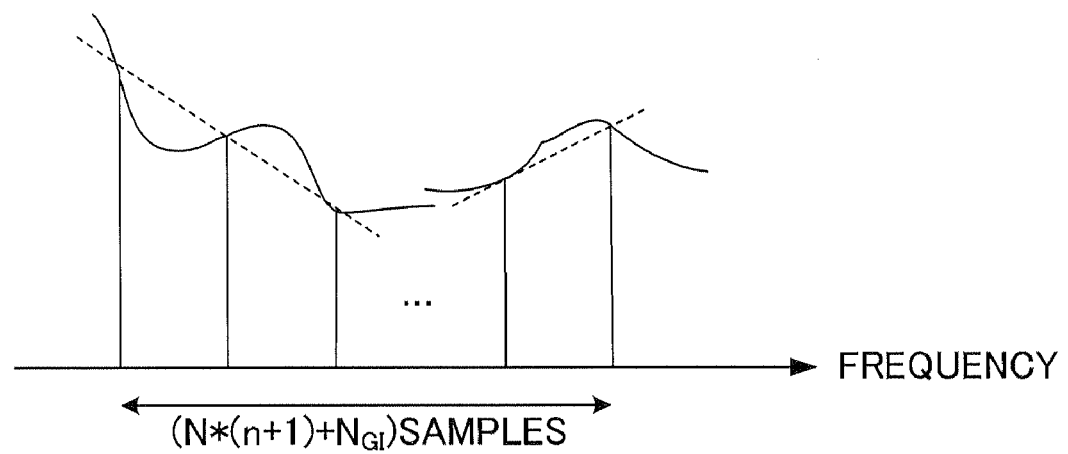
FIG. 10B shows another example of actual channel conditions and channel estimation values.

However, as shown in FIG. 10B, for example, if the frequency selectivity of the actual channel fluctuation values indicated by the solid line is large, a difference between the channel estimation values obtained through interpolation indicated by the dashed line and the actual channel fluctuation values is large, and therefore the accuracy of frequency equalization deteriorates.

Here, in this embodiment, the channel estimation values corresponding to the number of samples which correspond to the long FFT target segment is obtained without performing interpolation on the frequency axis.

The transmitting apparatus according to Embodiment 3 is the same as the transmitting apparatus according to Embodiment 1 (FIG. 2), and therefore the description thereof will be omitted.

Figure 11:
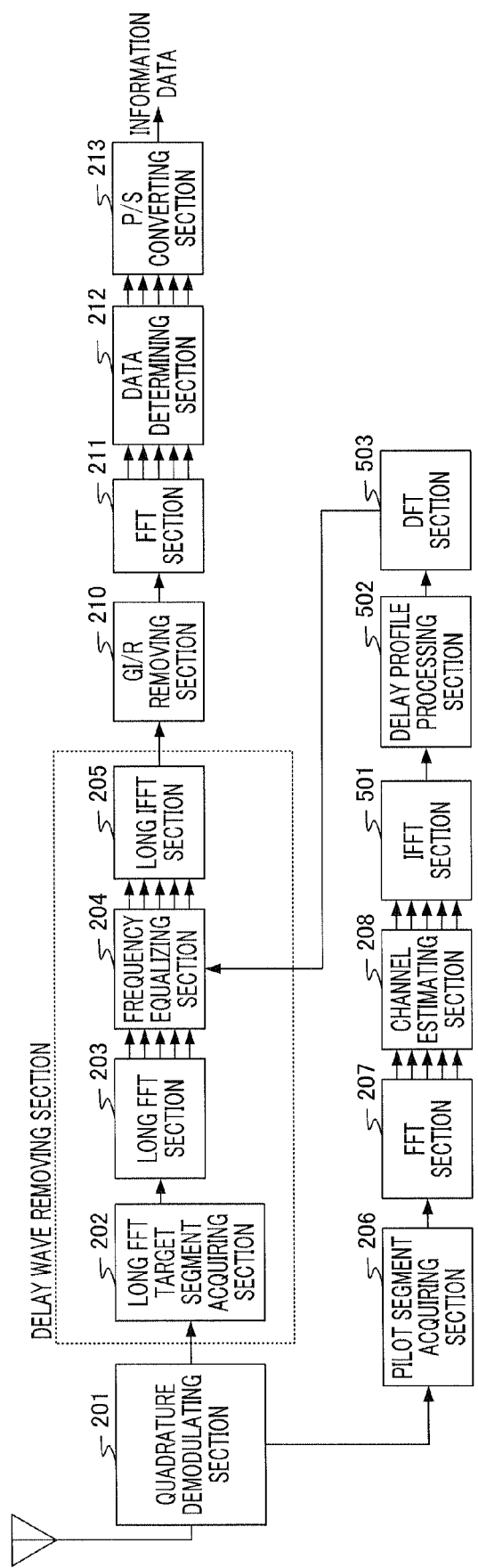
FIG. 11 is a block diagram showing the configuration of the main part of a receiving apparatus according to Embodiment 3 of the present invention.

FIG. 11 is a block diagram showing the configuration of the main part of the receiving apparatus according to Embodiment 3. In FIG. 11, the parts that are the same as those in FIG. 3 will be assigned the same reference numerals without further explanations. The receiving apparatus shown in FIG. 11 has quadrature demodulating section 201, long FFT target segment acquiring section 202, long FFT section 203, frequency equalizing section 204, long IFFT section 205, pilot segment acquiring section 206, FFT section 207, channel estimating section 208, GI/R removing section 210, FFT section 211, data determining section 212, P/S (Parallel/Serial) converting section 213, IFFT section 501, delay profile processing section 502 and DFT (Discrete Fourier Transform) section 503.

IFFT section 501 performs inverse fast Fourier transformation on a channel estimation value of each subcarrier, and transforms a frequency domain signal to a time domain signal. That is, IFFT section 501 generates a delay profile from the channel estimation value of each subcarrier. At this time, IFFT section 501 performs inverse fast Fourier transformation on the channel estimation values acquired from the pilot segment, and therefore generates a delay profile having the time length of the pilot symbol. Therefore, in the above-described example, a delay profile of the segment corresponding to N samples is generated. Furthermore, in general, the guard interval length is set longer than the delay time of the delay wave received the latest (hereinafter "maximum delay time"), and therefore, out of delay profiles of segments corresponding to N samples, a peak indicating delay waves occurs only in the segment corresponding to the segment $N_{gi}$ samples from the head.

Delay profile processing section 502 extends a delay profile of the time length of the pilot symbol and generates a delay profile corresponding to the time length of the long FFT target segment. At this time, delay profile processing section 502 adds signal 0 having an amplitude of 0 to the segment following the time length of the pilot symbol. Further, delay profile processing section 502, before extending the delay profile, regards peaks whose amplitude is lower than a predetermined value as noise and removes the peaks or shifts peaks whose amplitude is equal to or higher than a predetermined value and which occur after the guard interval length, to one symbol time length before, in the delay profile of the time length of the pilot symbol. Delay profile processing section 502 outputs a delay profile corresponding to the long FFT target segment obtained through processing as described above to DFT section 503.

DFT section 503 performs discrete Fourier transformation on the delay profile and transforms a time domain signal to a frequency domain signal. That is, DFT section 503 obtains the channel estimation values corresponding to the number of samples which correspond to the long FFT target segment from the delay profile corresponding to the time length of the long FFT target segment. That is, in the above-described example, the channel estimation values corresponding to [N×(n+1)+$N_{GI}$] samples of the subcarrier band are obtained.

Next, the operation of channel estimation value acquisition of the receiving apparatus configured as described above will be described with reference to FIG. 12 and FIG. 13. Furthermore, in the following description, the time length of each symbol (pilot symbol and information symbol) is assumed to be the N sample time, and the time length of the guard interval is assumed to be the $N_{GI}$ sample time, without taking into consideration the ramping segment.

In this embodiment, as in Embodiment 1, the pilot segment corresponding to the pilot symbol is acquired from the received signal by pilot segment acquiring section 206 and subjected to fast Fourier transformation by FFT section 207, and the channel estimation value of each subcarrier is acquired by channel estimating section 208.

At this time, when a subcarrier that does not include a pilot symbol exists at both ends of the bandwidth of the overall subcarriers, FFT section 207 performs fast Fourier transformation corresponding to the number of samples which correspond to the bandwidth of the subcarriers that include pilot symbols. Further, when a subcarrier that does not include pilot symbols exists in a position other than both ends of the bandwidth of the overall subcarriers, the channel estimation value of this subcarrier cannot be obtained, and fast Fourier transformation cannot be performed excluding this subcarrier as in the case described above. Therefore, channel estimating section 208 obtains the channel estimation values of the subcarriers that do not include pilot symbols through interpolation, for example. Furthermore, channel estimating section 208 may regard as noise the channel estimation values of subcarriers having a channel estimation value smaller than a predetermined threshold value and the channel estimation values of subcarriers corresponding to channel estimation values whose difference with the maximum channel estimation value is equal to or larger than a predetermined threshold value and delete those channel estimation values.

Although the channel estimation values obtained in this way are spread over the band of the subcarriers that include pilot symbols, fast Fourier transformation of N samples is performed on the pilot symbols, and therefore only N channel estimation values can be obtained on the frequency axis.

Figure 12A:
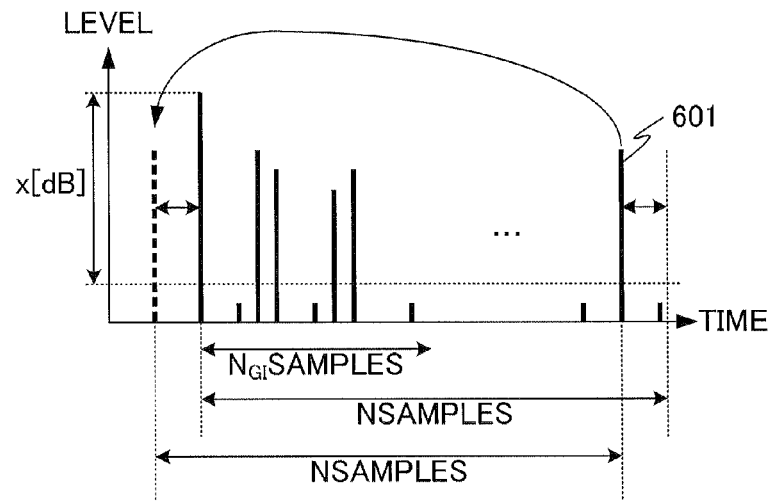
FIG. 12A explains processing according to Embodiment 3.

Then, these channel estimation values are converted to a time domain signal through inverse fast Fourier transformation performed by IFFT section 501, and a delay profile of the time length of the pilot symbol (equivalent to N samples or the number of samples corresponding to the bandwidth of the subcarriers including pilot symbols when a subcarrier that does not include a pilot symbol exists at both ends of the bandwidth) is obtained. The obtained delay profile is outputted to delay profile processing section 502, and, as shown in FIG. 12A, peaks at timings having an amplitude where a difference from the maximum amplitude is equal to or larger than a predetermined threshold value x [dB] are regarded as noise and deleted. Furthermore, delay profile processing section 502 shifts a peak which is not regarded as noise and appears after $N_{GI}$ samples corresponding to the guard interval length from the first peak to N sample time before, as in the case of peak 601 of FIG. 12A, and changes the range of a delay profile to N sample time from the shifted peak. As a result, if the guard interval length is set longer than the maximum delay time, the peaks that are not regarded as noise occur during the $N_{GI}$ sample time from the head in the delay profile of the N sample time. Furthermore, when the segment at the head of the delay profile has only peaks regarded as noise and the peak group not regarded as noise that follows this segment continues after $N_{GI}$ samples, delay profile processing section 502 may delete the segments regarded as noise at the head of the delay profile and shift the range of the delay profile forward.

Figure 12B:
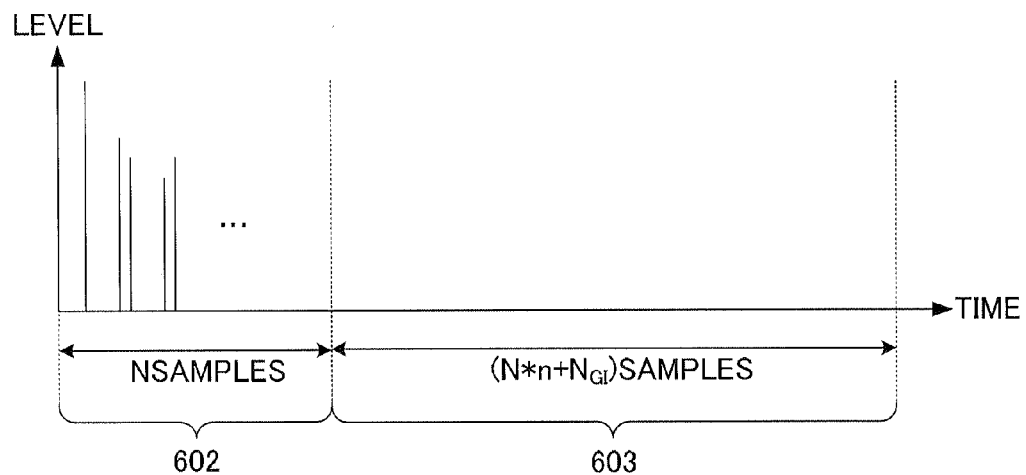
FIG. 12B explains another processing according to Embodiment 3.

Then, delay profile processing section 502 extends the range of the delay profile from the N sample time to the [N×(n+1)+$N_{GI}$] sample time corresponding to the long FFT target segment. At this time, as shown in FIG. 12B, delay profile processing section 502 adds segment 603 corresponding to the (N×n+$N_{GI}$) sample time comprised of signal 0 having an amplitude of 0 to segment 602 corresponding to the N sample time subjected to the above-described processing, and extends the range of the delay profile. In general, the guard interval length is set longer than the maximum delay time, and a delay wave of a pilot symbol will not arrive at the receiving apparatus after the $N_{GI}$ sample time from the head, and therefore segment 603 is comprised of signal 0. That is, even if a delay profile of an [N×(n+1)+$N_{GI}$] sample time is actually created, a peak indicating a delay wave will not occur in segment 603, and therefore signal 0 is added to segment 603. The delay profile acquired by the processing as described above is outputted to DFT section 503.

Figure 13:
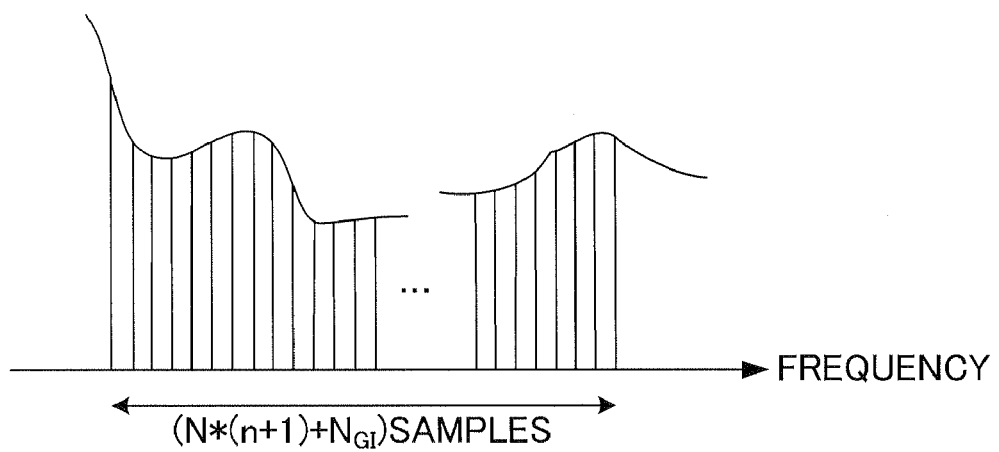
FIG. 13 shows an example of channel estimation value calculation results according to Embodiment 3.

Then, the delay profile extended to the [N×(n+1)+$N_{GI}$] sample time is subjected to discrete Fourier transformation by DFT section 503, and, as shown in FIG. 13, the channel estimation values corresponding to [N×(n+1)+$N_{GI}$] samples on the frequency axis are obtained. As a result, fine channel estimation values on the frequency axis that can be used in frequency equalization by frequency equalizing section 204 are obtained. Further, the obtained channel estimation values are values where a delay profile close to the actual delay profile of the [N×(n+1)+$N_{GI}$] sample time is transformed to a frequency domain signal, and therefore the accuracy of the channel estimation values of each frequency is higher than the case where interpolation is performed on the frequency axis.

As described above, according to this embodiment, a delay profile is created from channel estimation values obtained from a pilot segment, and a range of the created delay profile is extended in accordance with the long FFT target segment and transformed to the frequency domain, so that it is possible to obtain highly accurate channel estimation values in each frequency component of the long FFT target segment, and, as a result, improve the accuracy of frequency equalization.

Embodiment 4

Features of Embodiment 4 of the present invention include creating a delay profile from a signal of a pilot segment acquired on the receiving side and performing Fourier transformation, thereby obtaining fine channel estimation values on the frequency axis.

The transmitting apparatus according to Embodiment 4 is the same as the transmitting apparatus according to Embodiment 1 (FIG. 2), and therefore the description thereof will be omitted.

Figure 14:
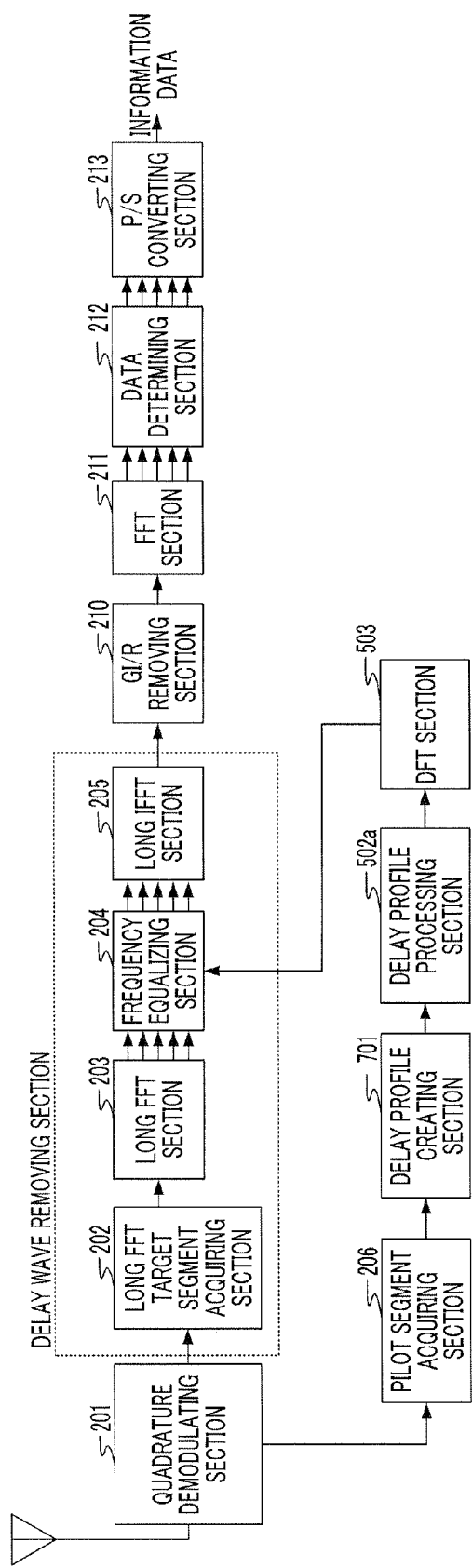
FIG. 14 is a block diagram showing the configuration of the main part of a receiving apparatus according to Embodiment 4 of the present invention.

FIG. 14 is a block diagram showing the configuration of the main part of a receiving apparatus according to Embodiment 4. In FIG. 14, the parts that are the same as those in FIG. 2 will be assigned the same reference numerals without further explanations. The receiving apparatus shown in FIG. 14 has quadrature demodulating section 201, long FFT target segment acquiring section 202, long FFT section 203, frequency equalizing section 204, long IFFT section 205, pilot segment acquiring section 206, GI/R removing section 210, FFT section 211, data determining section 212, P/S (Parallel/Serial) converting section 213, delay profile processing section 502a, DFT section 503 and delay profile creating section 701.

Delay profile creating section 701 takes correlation between the pilot segment and known pilot data and creates a delay profile where peaks occur during the period delay waves arrive.

Delay profile processing section 502a extends the delay profile of the time length of the pilot symbol and generates a delay profile corresponding to the time length of the long FFT target segment. At this time, delay profile processing section 502a performs nearly the same processing as delay profile processing section 502 of Embodiment 3, but, in this embodiment, the delay profile is created based on the correlation between the pilot segment and pilot data time waveforms, and therefore a large peak not regarded as noise following the $N_{GI}$ sample time from the head of the profile may not occur, and it is not necessary to shift peaks such as peak 601 of FIG. 12A.

In this embodiment, the delay profile is created based on the correlation of time waveforms between the pilot segment of the received signal and know pilot data, and therefore, when data of a time waveform having low autocorrelation is used as pilot data, large peaks occur only when the timings of the pilot segment and pilot data match, and an accurate delay profile is created.

The delay profile created in this way is extended and transformed to the frequency domain in the same way as Embodiment 3, and thereby the channel estimation values are obtained. At this time, if the created delay profile is accurate, the extended delay profile and the channel estimation values after discrete Fourier transformation are highly accurate.

As described above, according to this embodiment, a delay profile is created based on the correlation between the pilot segment of the received signal and known pilot data, a range of the created delay profile is extended in accordance with the long FFT target segment, and transformed to the frequency domain, so that it is possible to obtain a highly accurate channel estimation value in each frequency component of the long FFT target segment, and, as a result, improve the accuracy of frequency equalization. Further, when the autocorrelation of pilot data is low, the accuracy of the delay profile increases, and it is therefore possible to further improve the accuracy of the channel estimation values and frequency equalization.

Embodiment 5

Features of Embodiment 5 of the present invention include using an FIR (Finite Impulse Response filter) in the creation of the delay profile.

The transmitting apparatus according to Embodiment 5 is the same as the transmitting apparatus according to Embodiment 1 (FIG. 2), and therefore the description thereof will be omitted.

Further, the receiving apparatus according to Embodiment 5 has the same overall configuration as the receiving apparatus of Embodiment 4 (FIG. 14) with only the internal configuration of delay profile creating section 701 differing from that of Embodiment 4.

Figure 15A:
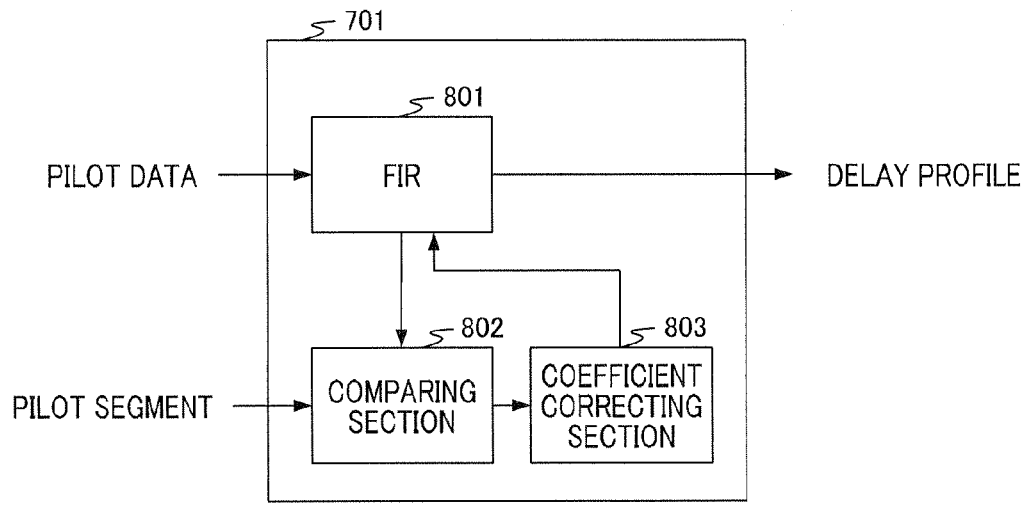
FIG. 15A is a block diagram showing the internal configuration of a delay profile creating section according to Embodiment 5 of the present invention.

FIG. 15A is a block diagram showing the internal configuration of delay profile creating section 701 according to Embodiment 5.

Figure 15B:
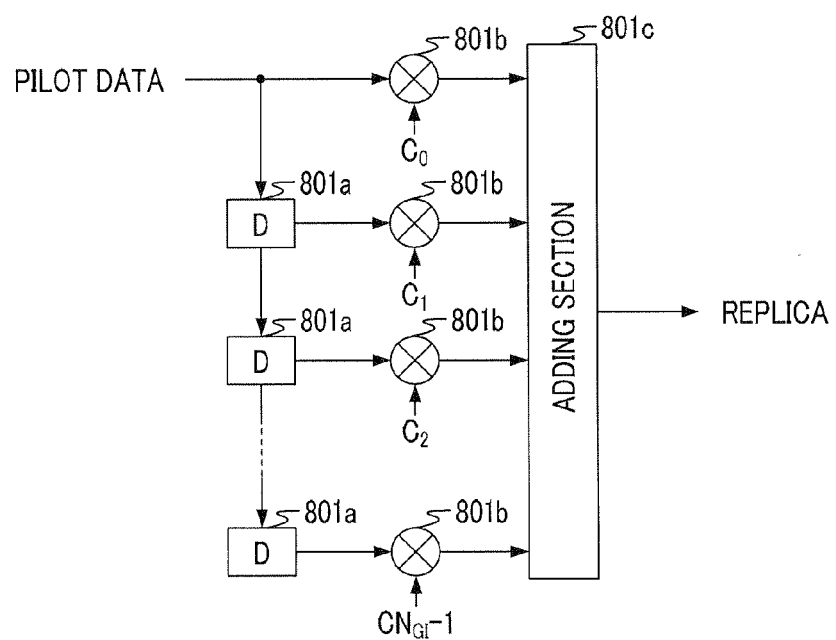
FIG. 15B shows an internal configuration of FIR according to Embodiment 5.

FIR 801 generates a replica of the pilot segment of the received signal by delaying and multiplying known pilot data by a tap coefficient, and outputs the replica to comparing section 802. Specifically, FIR 801, as shown in FIG. 15B, has delay element 801a, multiplier 801b and adding section 801c. Delay element 801a delays pilot data by one sample time at a time and holds the pilot data. The pilot data held in delay element 801a is equivalent to direct waves and delay waves of sample times 1 to $N_{GI}$. Multiplier 801b multiplies the pilot data and the pilot data held in delay element 801a by tap coefficients $C_0$ to $C_{NGI-1}$. Tap coefficients $C_0$ to $C_{NGI-1}$ are equivalent to the channel fluctuation with respect to the delay waves. The initial values of these tap coefficients $C_0$ to $C_{NGI-1}$ may be arbitrary, but, for example, by setting the initial values based on the channel estimation values obtained by other methods, it is possible to improve processing accuracy and shorten the processing time. Adding section 801c adds the output of multiplier 801b, generates a replica of the pilot segment in the received signal in which direct waves and delay waves exist, and outputs the replica to comparing section 802.

Furthermore, in this embodiment, FIR 801 has delay element 801a of one sample time, but the number of delay elements 801a may be increased to generate a replica in which the delay waves having ½ or ¼ sample time intervals are reproduced, for example. By this means, it is possible to create a more detailed delay profile.

Further, FIR 801 outputs tap coefficients $C_0$ to $C_{NGI-1}$ as a delay profile when a difference between the generated replica and actual pilot segment becomes a minimum.

Comparing section 802 calculates a difference between the replica generated by FIR 801 and the actual pilot segment of the received signal, and outputs the calculated difference to coefficient correcting section 803.

Coefficient correcting section 803 uses, for example, an LMS (Least Mean Square) algorithm or RMS (Root Mean Square) algorithm and corrects tap coefficients $C_0$ to $C_{NGI-1}$ so that the difference outputted from comparing section 802 becomes a minimum.

In this embodiment, a replica of a pilot segment in the received signal is generated from known pilot data by FIR 801, the replica and the actual pilot segment of the received signal are compared by comparing section 802, and tap coefficients $C_0$ to $C_{N_{GI}-1}$ of FIR 801 are corrected by coefficient correcting section 803 so that the difference between the replica and pilot segment becomes a minimum. These processings are repeatedly performed, and the difference between the replica and pilot segment becomes gradually small. In this process, the tap coefficients smaller than a predetermined threshold value may be regarded as noise and set to zero in subsequent processing. By this means, it is possible to reduce processing load and eliminate the influence of noise.

Then, when the replica and pilot segment are substantially same or the difference between the replica and pilot segment is converged to a sufficiently small value, it is determined that tap coefficients $C_0$ to $C_{N_{GI}-1}$ of FIR 801 correctly reproduce channel fluctuation with respect to the delay waves, and tap coefficients $C_0$ to $C_{N_{GI}-1}$ are outputted as a delay profile of the range of the $N_{GI}$ sample time. Upon output of tap coefficients $C_0$ to $C_{N_{GI}-1}$, FIR 801 may regard the tap coefficient smaller than a predetermined threshold value as noise and not output the coefficient.

The delay profile created in this way is extended, a range of the delay profile is extended and transformed to a frequency domain in the same way as Embodiments 3 and 4, and thereby the channel estimation values are obtained.

As described above, according to this embodiment, a replica of a pilot segment is generated using FIR, tap coefficients when the difference between the replica and actual pilot segment becomes sufficiently small are set as a delay profile, and the range of the delay profile is extended in accordance with the long FFT target segment and transformed to the frequency domain, so that it is possible to obtain a highly accurate channel estimation value in each frequency component of the long FFT target segment, and, as a result, improve the accuracy of frequency equalization. Further, by setting initial values of the FIR tap coefficients based on the channel estimation values obtained by other methods, it is possible to generate a more accurate delay profile in a short period of time.

Furthermore, in Embodiments 3 to 5 described above, a delay profile is used when the channel estimation values corresponding to the number of samples which correspond to the long FFT target segment are obtained, but similar processing may be performed when the channel estimation values corresponding to the number of samples which correspond to a predetermined time in the frequency domain other than the long FFT target segment are obtained. That is, by creating a delay profile of an arbitrary time longer than the guard interval length, extending the range of the delay profile, and transforming to the frequency domain, it is possible to obtain accurate channel estimation values without performing interpolation.

Embodiment 6

Features of Embodiment 6 of the present invention include, in MIMO communication, inserting a pilot symbol on a per stream basis in a pattern corresponding to the maximum delay time on the transmitting side, and subtracting a replica of each stream from the received signal and performing frequency equalization on the receiving side.

Figure 16:
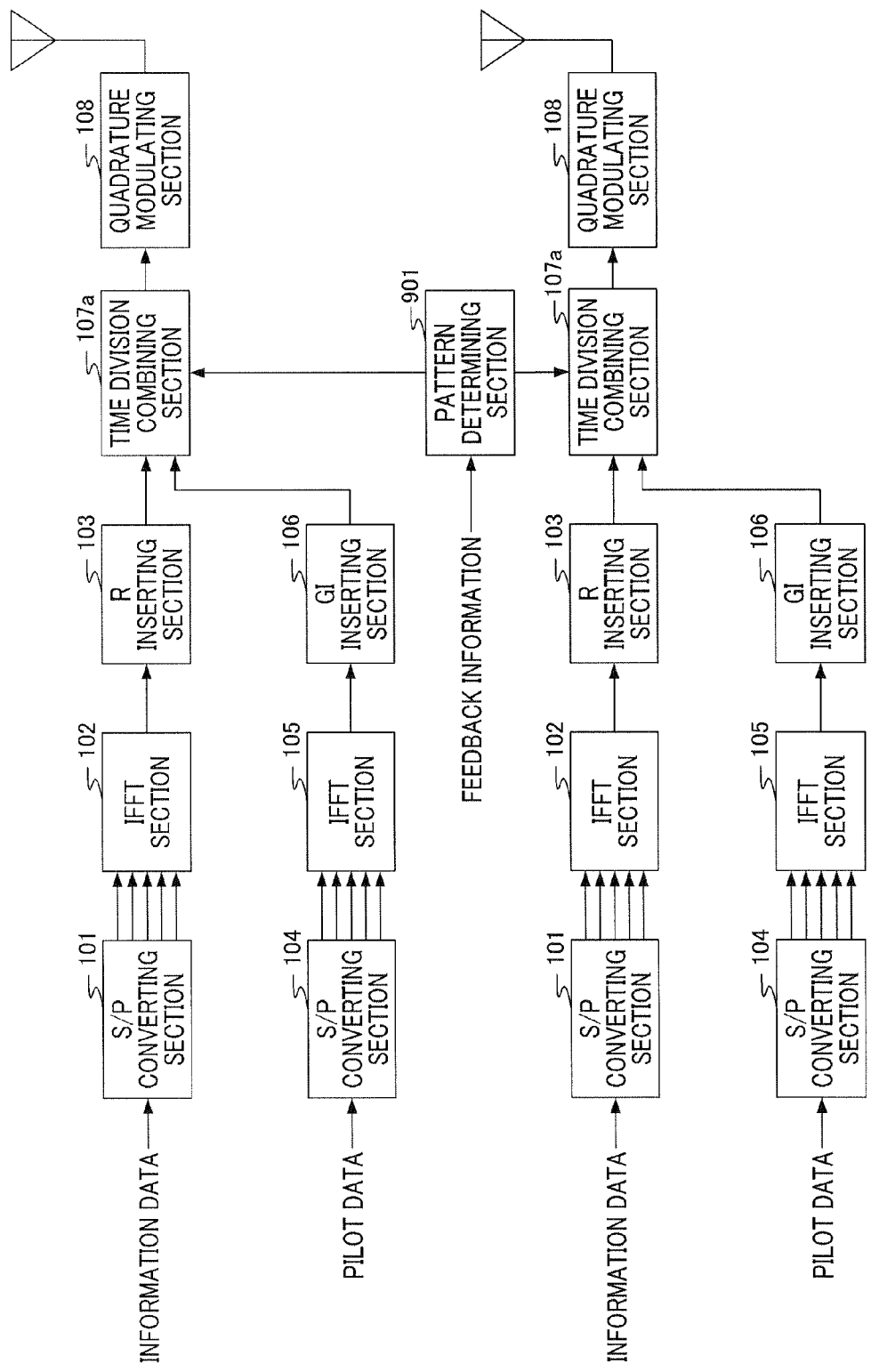
FIG. 16 is a block diagram showing the configuration of the main part of a transmitting apparatus according to Embodiment 6 of the present invention.

FIG. 16 is a block diagram showing the configuration of the main part of a transmitting apparatus according to Embodiment 6. In FIG. 16, the parts that are the same as those in FIG. 2 will be assigned the same reference numerals without further explanations. The transmitting apparatus shown in FIG. 16 is a MIMO transmitting apparatus having two antennas, and has S/P converting section 101, IFFT section 102, R inserting section 103, S/P converting section 104, IFFT section 105, GI inserting section 106, time division combining section 107a, and quadrature modulating section 108 corresponding to each antenna, along with pattern determining section 901.

Time division combining section 107a outputs to quadrature modulating section 108 the output from R inserting section 103 and the output from GI inserting section 106 while switching the output by time division according to the instruction from pattern determining section 901.

Pattern determining section 901 determines an arrangement pattern of the information symbols and pilot symbols of each stream according to feedback information such as the maximum delay time fed back from the receiving apparatus, for example. Specifically, during the period pilot symbols are arranged in one stream, pattern determining section 901 determines an arrangement pattern such that neither information symbols nor pilot symbols are arranged in other streams. In other words, pattern determining section 901 determines an arrangement pattern such that the pilot symbols of the streams are orthogonal each other.

At this time, if the maximum delay time is less than or equal to the guard interval length, pattern determining section 901 determines an arrangement pattern in which the pilot symbols of all streams are continuously transmitted symbol by symbol between the data stream having a series of information symbols and the next data stream. On the other hand, if the maximum delay time exceeds the guard interval length, pattern determining section 901 determines an arrangement pattern in which the pilot symbols of only one stream are transmitted between data streams. Furthermore, when the maximum delay time exceeds the guard interval length, the pilot symbols of one stream may be repeatedly arranged between data streams.

Figure 17:
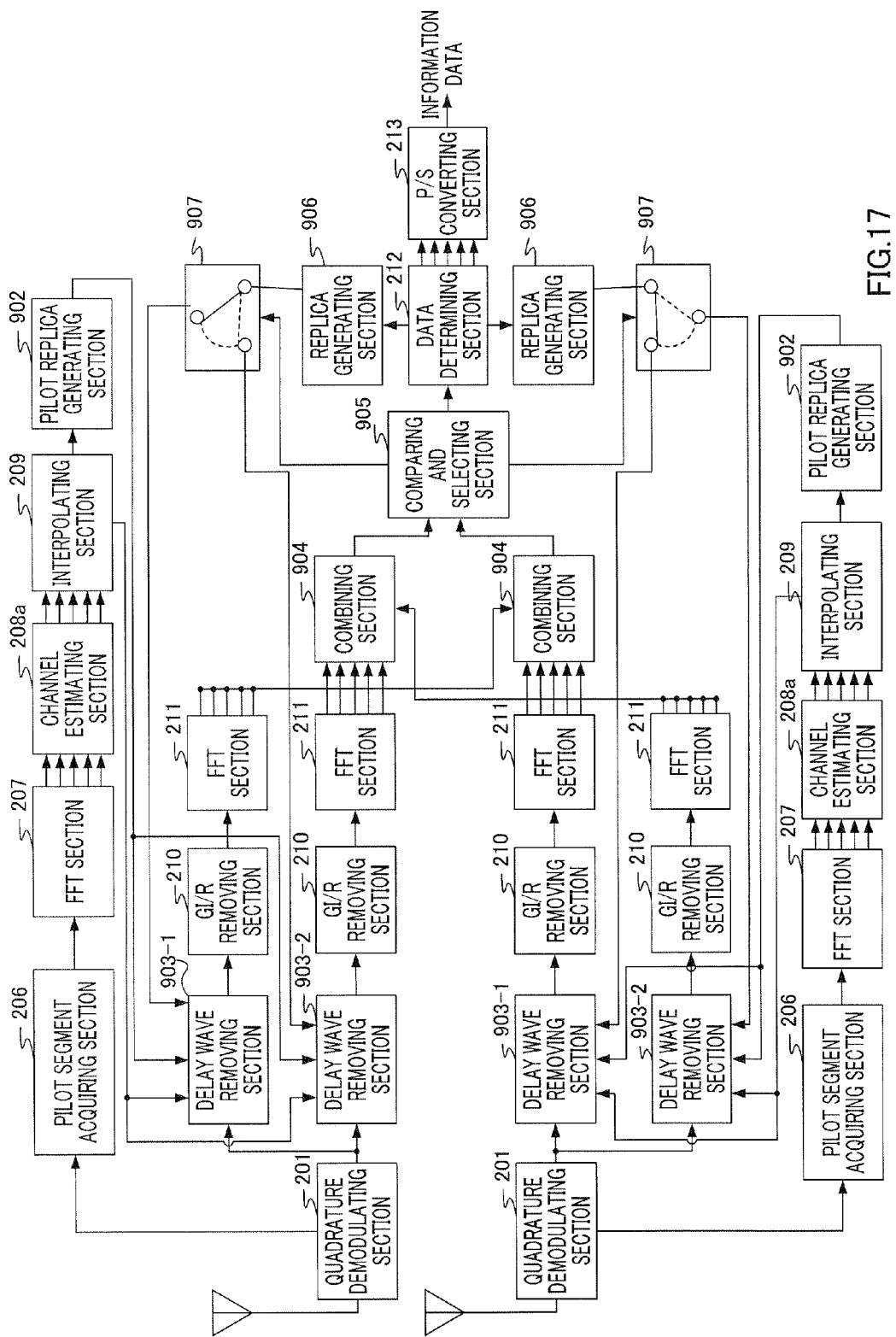
FIG. 17 is a block diagram showing the configuration of the main part of a receiving apparatus according to Embodiment 6.

FIG. 17 is a block diagram showing the configuration of the main part of a receiving apparatus according to Embodiment 6. In FIG. 17, the parts that are the same as those in FIG. 2 will be assigned the same reference numerals without further explanations. The receiving apparatus shown in FIG. 17 is a MIMO receiving apparatus having two antennas, and has quadrature modulating section 201, pilot segment acquiring section 206, FFT section 207, channel estimating section 208a, interpolating section 209, GI/R removing section 210, FFT section 211, pilot replica generating section 902, delay wave removing sections 903-1 and 903-2, combining section 904, replica generating section 906, and switch 907 corresponding to each antenna, along with data determining section 212, P/S converting section 213 and comparing and selecting section 905.

Channel estimating section 208a performs channel estimation of each subcarrier per a stream basis on the transmitting side using a pilot segment, and outputs the obtained channel estimation value of each stream to interpolating section 209.

Pilot replica generating section 902 generates a reception replica of the pilot symbol corresponding to each stream (hereinafter "pilot replica") from the channel estimation value and known pilot data of each stream. That is, pilot replica generating section 902 multiplies the pilot data by the channel estimation value of each stream, and outputs the obtained pilot replica of each stream to delay wave removing sections 903-1 and 903-2.

Figure 18:
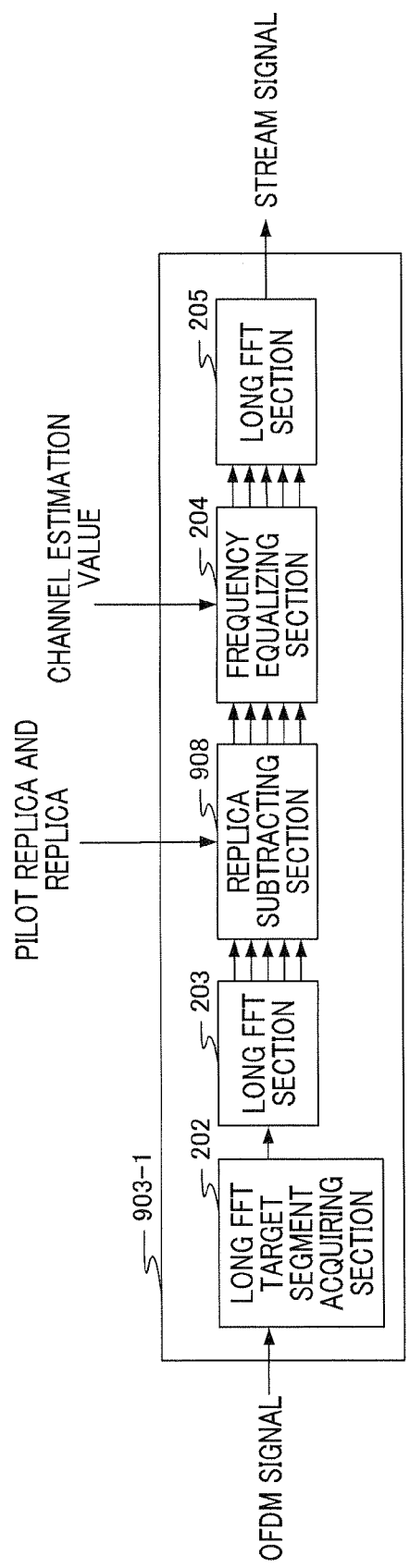
FIG. 18 is a block diagram showing the internal configuration of a delay wave removing section according to Embodiment 6.

Delay wave removing sections 903-1 and 903-2 are provided so as to correspond to the streams on the transmitting side, and remove delay waves on a per stream basis. Specifically, delay wave removing section 903-1 has the internal configuration shown in FIG. 18. In FIG. 18, the parts that are the same as those in FIG. 3 will be assigned the same reference numerals without further explanations. Furthermore, delay wave removing section 903-2 has the same configuration as delay wave removing section 903-1, but in this embodiment, channel estimating section 208a performs channel estimation on a per stream basis, and therefore the channel estimation values outputted to frequency equalizing section 204 from interpolating section 209 are different between delay wave removing section 903-1 and delay wave removing section 903-2.

Replica subtracting section 908 subtracts the pilot replica generated by pilot replica generating section 902 and the replica generated by replica generating section 906 described later from the long FFT target segment. By subtracting the pilot replica from the long FFT target segment, it is possible to remove the influence of intersymbol interference caused by the pilot symbol. Further, as described in detail later, by subtracting the replica generated by replica generating section 906 from the long FFT target segment, it is possible to remove the influence of streams not corresponding to the delay wave removing sections and perform frequency equalization only on streams corresponding to the delay wave removing sections.

With reference to FIG. 17 once again, combining section 904 combines the data of the information symbols of each subcarrier, which is outputted from FFT section 211 corresponding to each antenna and subjected to frequency equalization for the same stream. Upon combination, maximum ratio combination based on the channel characteristics of the frequency equalization target stream and the like is used. Then, combining section 904 outputs the combined data of each stream to comparing and selecting section 905.

Comparing and selecting section 905 compares the reception quality of the combined data of each stream, outputs the combined data of a stream having the highest reception quality to data determining section 212, and reports a comparison result of the reception quality to switch 907.

Replica generating section 906 multiplies a demodulation result of data determining section 212 of the stream having the highest reception quality by a channel estimation value corresponding to that stream and generates a replica of the data stream (information symbols) corresponding to the stream having the highest reception quality.

Switch 907, according to the comparison result of the reception quality performed by comparing and selecting section 905, outputs the replica to delay wave removing section 903-1 or delay wave removing section 903-2. Specifically, switch 907 outputs the replica to the delay wave removing section corresponding to a stream other than the stream having the highest reception quality. Therefore, when, for example, the reception quality of stream 1 corresponding to delay wave removing section 903-1 is highest, switch 907 outputs the replica of the data stream of stream 1 to delay wave removing section 903-2.

Next, the operation of the transmitting apparatus and receiving apparatus configured as described above will be described with reference to FIG. 19.

First, arrangement of the pilot symbols of each stream in the transmitting apparatus will be described.

In this embodiment as well, similar to Embodiment 1, the information symbols in which a ramping segment is inserted and the pilot symbol in which a guard interval is inserted are outputted to time division combining section 107a. However, in this embodiment, the information symbols and pilot symbol are outputted to time division combining section 107a of each stream respectively corresponding to a plurality of antennas.

Figure 19A:
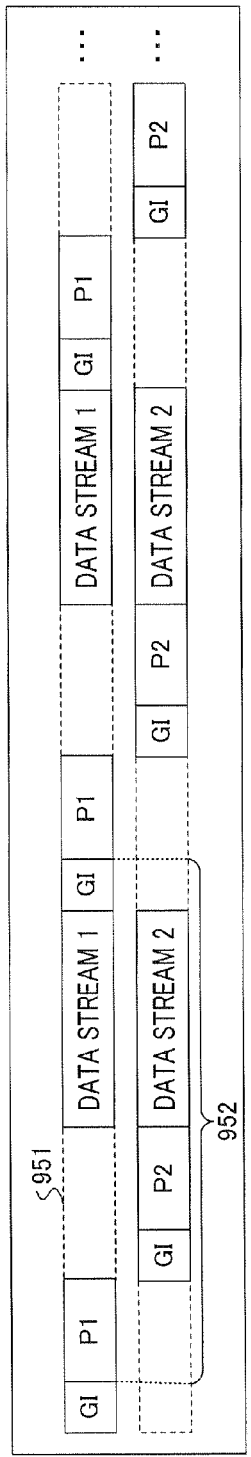
FIG. 19A shows an example of an arrangement pattern according to Embodiment 6.

Further, in this embodiment, information such as a maximum delay time, for example, is fed back from the receiving apparatus, and the fed back information is outputted to pattern determining section 901. Then, when it is determined whether or not the maximum delay time exceeds the guard interval length and the maximum delay time is determined to be less than or equal to the guard interval length, pattern determining section 901 determines an arrangement pattern of the pilot symbols of each stream as shown in FIG. 19A, for example. In the arrangement pattern shown in FIG. 19A, pilot symbol P1 of one stream, stream 1 (the upper stream in the figure), is immediately followed by pilot symbol P2 of another stream, stream 2 (the bottom stream in the figure), and data stream 1 and data stream 2 of the respective streams are arranged after pilot symbol P2.

At this time, the period the pilot symbol of one stream is arranged becomes a non-transmission period for another stream. That is, the period pilot symbol P2 of stream 2 is transmitted, for example, is non-transmission period 951 in which neither pilot symbols nor information symbols are transmitted in stream 1.

When the maximum delay time is less than or equal to the guard interval length, the delay waves of data stream 1 and data stream 2 do not influence pilot symbol P1, and therefore the pilot symbols of all streams may be continuously arranged during the periods between data streams. Then, by adopting the arrangement pattern as shown in FIG. 19A, the period between pilot symbols of the same stream can be made shortest, so that it is possible to improve the accuracy of channel estimation of the receiving apparatus even when fading fluctuation is significant. Further, in a case of the arrangement pattern as shown in FIG. 19A, segment 952 from pilot symbol P1 to the guard interval inserted immediately before the next pilot symbol P1 becomes the long FFT target segment of the receiving apparatus.

Figure 19B:
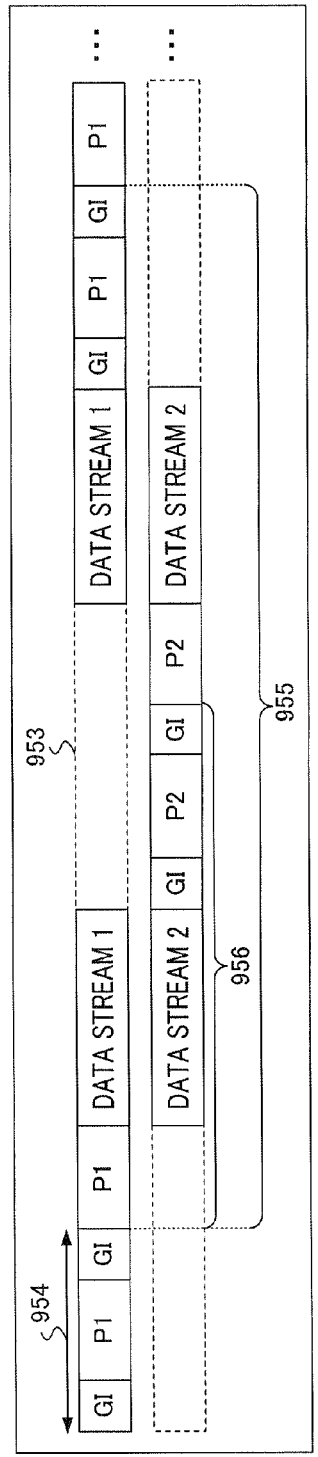
FIG. 19B shows another example of an arrangement pattern according to Embodiment 6.
Figure 19C:
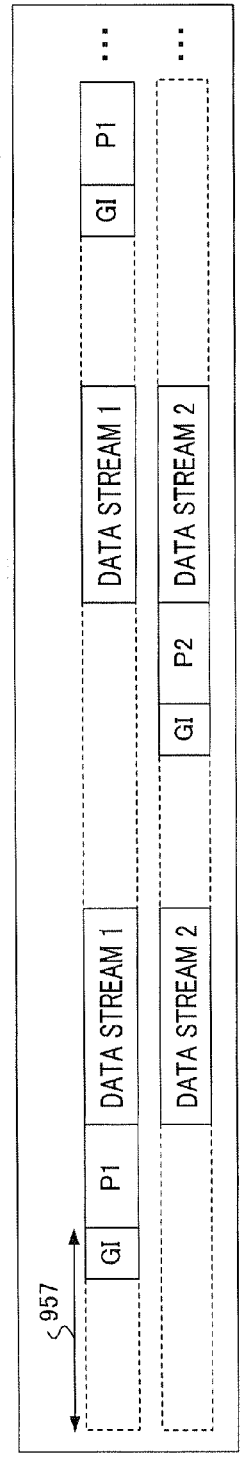
FIG. 19C shows yet another example of an arrangement pattern according to Embodiment 6.

On the other hand, when the maximum delay time exceeds the guard interval and an arrangement pattern is assumed to be as shown in FIG. 19A, the delay waves of data stream 1 and data stream 2 influence pilot symbol P1, and the accuracy of channel estimation regarding stream 1 may deteriorate. Here, when the maximum delay time exceeds the guard interval length, pattern determining section 901 determines the arrangement pattern as shown in FIG. 19B or FIG. 19C, for example. In the arrangement pattern shown in FIG. 19C, either pilot symbol P1 of stream 1 or pilot symbol P2 of stream 2 is repeatedly arranged during the period between data streams. Therefore, for example, the period pilot symbol P2 of stream 2 is repeatedly transmitted is non-transmission period 953 in which neither pilot symbols nor information symbols are transmitted in stream 1.

When the maximum delay time exceeds the guard interval length, the delay waves of data stream 1 and data stream 2 influence the pilot symbol immediately after these data streams, and therefore the pilot symbol of the same stream is repeatedly arranged in the period between data streams. This extends the actual guard interval length to segment 954. Furthermore, when the transmitting apparatus has three or more antennas and the period a pilot symbol is arranged in one stream is a non-transmission period for another stream, a pilot symbol may be repeatedly arranged in a plurality of streams in the period between data streams.

By adopting the arrangement pattern as shown in FIG. 19B, although the period between pilot symbols in the same stream becomes long, the actual guard interval length can be extended as described above, so that it is possible to eliminate the influence of the delay waves of data streams that extend beyond the guard interval length. Further, although the pilot symbol immediately after a data stream is influenced by data stream delay waves, the pilot symbol can be used for the establishment of synchronization at the receiving apparatus, for example.

Further, in a case of the arrangement pattern as shown in FIG. 19B, in order to ensure periodicity of pilot symbols in the same stream, segment 955 from pilot symbol P1 immediately before the data stream to the guard interval inserted immediately before the next pilot symbol P1 located in the same position becomes the long FFT target segment of the receiving apparatus. However, at the receiving apparatus, when the replica of the pilot symbol is subtracted to perform frequency equalization, the periodicity of the pilot symbol in the same stream is not necessarily required, and therefore segment 956 from pilot symbol P1 immediately before the data stream to the guard interval inserted immediately before pilot symbol P2 immediately before the next data stream may be set as the long FFT target segment.

In the arrangement pattern shown in FIG. 19C, either pilot symbol P1 of stream 1 or pilot symbol P2 of stream 2 is arranged immediately before each data stream, and a non-transmission period in both streams is provided before the guard interval inserted in each pilot symbol. In this case, segment 957 that includes a non-transmission period in both streams becomes the actual guard interval length. Then, when the arrangement pattern is compared with the arrangement pattern shown in FIG. 19B, the non-transmission periods increase, so that it is possible to reduce power consumption.

In this way, the transmitting apparatus determines whether or not the maximum delay time exceeds the guard interval length according to the feed back information from the receiving apparatus, and switches the arrangement pattern of the pilot symbol of each stream. By this means, it is possible to improve the accuracy of channel estimation at the receiving apparatus, and, as a result, the receiving apparatus can accurately remove delay waves through frequency equalization.

Next, delay wave removal of each stream at the receiving apparatus will be described.

The OFDM signal received by each antenna of the receiving apparatus is demodulated to a baseband by quadrature demodulating section 201. The OFDM signal received by each antenna of the receiving apparatus includes the signals of all streams of the transmitting apparatus. The OFDM signal converted to a baseband is outputted to long FFT target segment acquiring section 202 in delay wave removing sections 903-1 and 903-2, and the pilot segment corresponding to the pilot symbol of each stream is acquired from the OFDM signal converted to a baseband by pilot segment acquiring section 206.

The acquired pilot segment of each stream is subjected to fast Fourier transformation by FFT section 207, and the data of each subcarrier is outputted to channel estimating section 208a, in the same way as Embodiment 1. Then, the channel estimation value of each subcarrier is obtained on a per stream basis by channel estimating section 208a. That is, the channel estimation value of each subcarrier of the channel between all antennas of the transmitting apparatus is estimated by channel estimating section 208a corresponding to each antenna of the receiving apparatus.

The channel estimation value of each subcarrier and each stream is outputted to interpolating section 209, and fine channel estimation values in the frequency domain are obtained through interpolation. The channel estimation values obtained through interpolation are outputted to pilot replica generating section 902 and frequency equalizing section 204 in delay wave removing sections 903-1 and 903-2. Then, pilot replica generating section 902 multiplies the channel estimation value of each stream by known and invariant pilot data of each stream and generates a reception replica of the pilot symbol (pilot replica). The generated pilot replica is outputted to replica subtracting section 908 in delay wave removing sections 903-1 and 903-2.

Then, the delay waves of each stream of the transmitting apparatus are removed through frequency equalization by delay wave removing sections 903-1 and 903-2. That is, the long FFT target segment is acquired from the OFDM signal by long FFT target segment acquiring section 202 and subjected to fast Fourier transformation by long FFT section 203, and the signal after fast Fourier transformation is outputted to replica subtracting section 908. Then, the pilot replica of each stream is subtracted from the signal after fast Fourier transformation by replica subtracting section 908.

Specifically, when the arrangement pattern of the pilot symbols of the transmitting apparatus is as shown in FIG. 19A, for example, the replica of pilot symbol P1 of stream 1 and the replica of pilot symbol P2 of stream 2 are subtracted by replica subtracting section 908 in delay wave removing sections 903-1 and 903-2. Furthermore, in this embodiment, pilot replicas are subtracted, so that it is possible to use the long FFT target segment as segment 956 even when pilot symbols are transmitted in the arrangement pattern shown in FIG. 19B.

Then, replica subtracting section 908 of delay wave removing sections 903-1 and 903-2 temporarily stores the signal after pilot replica subtraction in preparation for subsequent replica subtraction, and outputs the signal to frequency equalizing section 204. The signal subjected to pilot replica subtraction is subjected to frequency equalization using the channel estimation value of each stream, and the frequency components corresponding to delay waves of each stream are removed by frequency equalizing section 204. That is, frequency equalization of stream 1 is performed by frequency equalizing section 204 in delay wave removing section 903-1, and frequency equalization of stream 2 is performed by frequency equalizing section 204 in delay wave removing section 903-2. At this time, the frequency equalization by each frequency equalizing section 204 of delay wave removing sections 903-1 and 903-2 is performed on a signal in which all streams exist in the transmitting apparatus. However, the channel estimation values used for frequency equalization are specific to each stream, and therefore the intersymbol interference of the streams not to be subjected to frequency equalization is not removed.

The signal subjected to frequency equalization in this way is transformed to a time domain signal again (stream signal) by long IFFT section 205, the guard intervals and ramping segments are removed from the stream signal after delay waves are removed, by GI/R removing section 210, and the information symbols of each stream are outputted to FFT section 211 symbol by symbol. The information symbols of each stream are subjected to fast Fourier transformation by corresponding FFT section 211, and the data of each subcarrier is outputted to corresponding combining section 904.

Then, the data of each subcarrier is combined, and the combined data of each stream is outputted to comparing and selecting section 905 by combining section 904, and the reception quality of the combined data of each stream is compared. This comparison result is reported to switch 907, and the combined data of the stream having the highest reception quality is outputted to data determining section 212.

When the comparison result is reported to switch 907, switch 907 switches so that replica generating section 906 and replica subtracting section 908 corresponding to a stream other than the stream having the highest reception quality are connected. That is, when the reception quality of the combined data of stream 2 is the highest, for example, switch 907 connects replica generating section 906 and replica subtracting section 908 in delay wave removing section 903-1 corresponding to stream 1, as shown in FIG. 17.

On the other hand, when the combined data of the stream having the highest reception quality is outputted to data determining section 212, data determination is performed on the combined data, and the obtained information data is outputted to P/S converting section 213 and replica generating section 906. Then, replica generating section 906 multiplies the information data by the channel estimation value of the stream and generates a replica of the information symbols of the stream having the highest reception quality. The generated replica is outputted to replica subtracting section 908 corresponding to a stream other than the stream having the highest reception quality via switch 907 switched as described above. That is, when the reception quality of the combined data of stream 2 is highest, for example, the replica of the information symbols of stream 2 is outputted to replica subtracting section 908 in delay wave removing section 903-1 corresponding to stream 1.

The signal after pilot replica subtraction is stored in replica subtracting section 908, and therefore replica subtracting section 908 to which the replica is outputted from replica generating section 906 further subtracts the replica from the stored signal. That is, replica subtracting section 908 subtracts the replica of the information symbols in streams not corresponding to the delay wave removing sections and demultiplexes the information symbols in the streams corresponding to the delay wave removing sections. That is, in the above example, replica subtracting section 908 in delay wave removing section 903-1 subtracts the replica of the information symbols of stream 2 and demultiplexes the information symbols of stream 1. Then, the replica outputted to replica subtracting section 908 is a replica of the information symbols of the stream having the highest reception quality, and therefore the information symbols are accurately demultiplexed.

Then, the signal from which the pilot replica and a replica are subtracted by replica subtracting section 908 is subjected to frequency equalization again by frequency equalizing section 204. At this time, frequency equalizing section 204 performs frequency equalization on a signal in which the stream having the highest reception quality out of the streams at the transmitting apparatus is demultiplexed and removed.

Thereafter, the above-described processing is repeated until all streams at the transmitting apparatus are demultiplexed, and it is thereby possible to accurately demultiplex streams and remove delay wave components even when frequency equalization is performed on a signal in which a plurality of streams of the transmitting apparatus exist.

As described above, according to this embodiment, when MIMO communication is performed, a transmitting apparatus determines the arrangement of the pilot symbols of each stream corresponding to the maximum delay time, inserts a guard interval only in each pilot symbol, and perfumes transmission. A receiving apparatus sequentially generates a replica of the information symbols of the stream having the highest reception quality, and repeats subtraction of the replica from the received signal and frequency equalization. As a result, in MIMO communication, it is possible to improve accuracy of channel estimation and frequency equalization at the receiving apparatus by arranging the pilot symbols of each stream so that the pilot symbols are orthogonal each other, and accurately demultiplex streams.

Furthermore, in the above-described embodiments, although the case of an OFDM scheme and SC scheme has been described, the present invention can be applied to radio communication of a CDM (Code Division Multiplexing) scheme.

The transmitting apparatus according to a first aspect of the present invention employs a configuration having: a first generating section that generates a plurality of information symbols from information data; a second generating section that generates a pilot symbol from pilot data of a known and invariant pattern; an adding section that adds a guard interval only immediately before the pilot symbol; and a transmitting section that transmits a signal having a frame configuration where the plurality of information symbols follow a pilot symbol to which a guard interval is added.

According to this configuration, a guard interval is added only to the pilot symbol, and a signal having a frame configuration where a guard interval is not added to information symbols is transmitted, so that it is possible to further reduce the ratio of redundant components in the signal and improve the transmission efficiency. Further, it is possible to perform channel estimation and frequency equalization using a pilot symbol on the receiving side, and thereby remove delay waves even without guard intervals and suppress intersymbol interference.

The transmitting apparatus according to a second aspect of the present invention employs a configuration wherein, in the above-described first aspect, the first generating section has: an S/P converting section that performs S/P conversion on information data; and a transformation section that assigns parallel data obtained through S/P conversion to a plurality of subcarriers having different frequencies and transforms the data to information symbols of a time domain.

According to this configuration, information data is S/P converted, assigned to a plurality of subcarriers, and transformed to time domain information symbols, and therefore the information data is subjected to OFDM modulation, so that it is possible to improve transmission efficiency without inserting guard intervals between information symbols, even in an OFDM scheme.

The transmitting apparatus according to a third aspect of the present invention employs a configuration wherein, in the above-described first aspect, the first generating section inserts between information symbols a ramping segment where an amplitude gradually increases and decreases.

According to this configuration, a ramping segment where an amplitude gradually increases and decreases is inserted between information symbols, so that it is possible to suppress discontinuity of the continuous waveform between information symbols.

The transmitting apparatus according to a fourth aspect of the present invention employs a configuration wherein, in the above-described first aspect, when the quadrature transformation associated with frequency equalization is performed at a communicating party station, the adding section adds immediately before a pilot symbol of a next frame, a guard interval having a length such that a length from immediately after the pilot symbol to immediately before the pilot symbol of the next frame is a power of two or an integral multiple of a power of two when the length is taken as the number of samples in the quadrature transformation.

According to this configuration, a length between the pilot symbols of two consecutive frames becomes a power of two or an integral multiple of a power of two when the length is taken as the number of samples in the quadrature transformation by the communicating party station, so that it is possible to efficiently perform frequency equalization at the communicating party station.

The transmitting apparatus according to a fifth aspect of the present invention employs a configuration wherein, in the above-described first aspect, when the quadrature transformation associated with frequency equalization is performed at a communicating party station, the adding section adds immediately before a pilot symbol of a next frame, a guard interval having a length such that a length from a head of the pilot symbol to immediately before the pilot symbol of the next frame is an integral multiple of the number of samples of one information symbol when the length is taken as the number of samples in the quadrature transformation.

According to this configuration, a length between the pilot symbols of two consecutive frames becomes an integral multiple of the number of samples of one information symbol when the length is taken as the number of samples in the quadrature transformation by the communicating party station, the fast Fourier transformation performed on the information symbol segments of the communicating party station can be easily achieved by combining (or repeatedly using) a plurality of normal fast Fourier transformation circuits for one symbol, so that it is possible to reduce the circuit scale of the communicating party station.

The transmitting apparatus according to a sixth aspect of the present invention employs a configuration further having in the above-described first aspect: a plurality of transmitting antennas; and a determining section that determines an arrangement pattern of the pilot symbols where the pilot symbols corresponding to the transmitting antennas are orthogonal each other, wherein the transmitting section transmits streams where a pilot symbol to which a guard interval is added is arranged and the plurality of information symbols are arranged following the pilot symbol, from the plurality of transmitting antennas according to a determined arrangement pattern.

According to this configuration, a stream of an arrangement pattern where the pilot symbols corresponding to a plurality of transmitting antennas are orthogonal each other is transmitted from each transmitting antenna, so that it is possible to prevent interference between the streams of the pilot symbols and improve the accuracy of channel estimation on the receiving side.

The transmitting apparatus according to a seventh aspect of the present invention employs a configuration wherein, in the above-described sixth aspect, the determining section determines an arrangement pattern where, during the period a pilot symbol corresponding to one transmitting antenna is arranged, pilot symbols and information symbols corresponding to other transmitting antennas are not arranged.

According to this configuration, during the period a pilot symbol is transmitted from one transmitting antenna, nothing is transmitted from any other transmitting antenna, so that it is possible to reliably prevent interference between the streams of pilot symbols.

The transmitting apparatus according to an eighth aspect of the present invention employs a configuration wherein, in the above-described sixth aspect, when a maximum delay time is equal to or less than the guard interval length, the determining section determines an arrangement pattern where the pilot symbols corresponding to all transmitting antennas are arranged consecutively one after the other and the plurality of information symbols are arranged following the arranged pilot symbol group.

According to this configuration, when the maximum delay time is equal to or less than the guard interval length, all pilot symbols are consecutively arranged one after the other and information symbols are arranged following the pilot symbols, so that it is possible to minimize the interval in which pilot symbols are transmitted from each transmitting antenna and accurately perform channel estimation on the receiving side, even when fading fluctuation is large.

The transmitting apparatus according to a ninth aspect of the present invention employs a configuration wherein, in the above-described sixth aspect, when a maximum delay time exceeds the guard interval length, the determining section determines an arrangement pattern where a pilot symbol or a non-transmission period corresponding to the same transmitting antenna is arranged before the plurality of information symbols and immediately before the closest pilot symbol.

According to this configuration, when the maximum delay time exceeds the guard interval length, a pilot symbol or a non-transmission period corresponding to the same transmitting antenna is arranged before the plurality of information symbols and immediately before the closest pilot symbol, so that it is possible to make the actual guard interval length long by the symbol length of the pilot symbol or the non-transmission period, and, as a result, remove the intersymbol interference of the pilot symbol on the receiving side.

The receiving apparatus according to a tenth aspect of the present invention employs a configuration having: a receiving section that receives a signal having a frame configuration where a plurality of information symbols follow a pilot symbol comprised of pilot data of a known and invariant pattern; a calculating section that calculates a channel estimation value of each frequency corresponding to a time length which is equal to or longer than the pilot segment using a pilot segment corresponding to the pilot symbol; and a removing section that removes the delay waves included in information symbol segments corresponding to the plurality of information symbols using the calculated channel estimation values.

According to this configuration, delay waves are removed by performing channel estimation using a pilot symbol and obtaining the channel estimation values for the information symbol segments, so that it is possible to suppress intersymbol interference even without guard intervals. Further, it is not necessary to add guard intervals at the transmitting side, so that it is possible to further reduce the ratio of redundant components in a signal and improve the transmission efficiency.

The receiving apparatus according to an eleventh aspect of the present invention employs a configuration wherein, in the above-described tenth aspect, the calculating section has: an estimating section that performs channel estimation using the pilot segment; and an interpolating section that interpolates the channel estimation results on a frequency axis and obtains channel estimation values.

According to this configuration, channel estimation values are obtained through interpolation, so that it is possible to acquire a channel estimation value of each frequency corresponding to the time length which is equal to or longer than the pilot segment using simple processing.

The receiving apparatus according to a twelfth aspect of the present invention employs a configuration wherein, in the above-described tenth aspect, the removing section has: an acquiring section that acquires the information symbol segment from a received signal; a quadrature transformation section that performs quadrature transformation on the information symbol segment to transform the segment to a frequency domain signal; a frequency equalizing section that removes frequency components corresponding to delay waves from the frequency domain signal using the channel estimation values obtained by the calculating section; and an inverse quadrature transformation section that performs inverse quadrature transformation on a signal from which the frequency components corresponding to delay waves are removed and transforms the signal to a time domain signal.

According to this configuration, the information symbol segment is transformed to a frequency domain signal and then transformed to a time domain signal after frequency equalization, so that it is possible to efficiently remove delay waves using the channel estimation values of the information symbol segment obtained through interpolation.

The receiving apparatus according to a thirteenth aspect of the present invention employs a configuration having: a receiving section that receives a signal that includes a pilot symbol comprised of known pilot data; a creating section that creates a delay profile of a range equal to or larger than a maximum delay time using a pilot segment corresponding to the pilot symbol; an extending section that extends the created delay profile by adding a segment having an amplitude of 0 to the delay profile; and a transformation section that performs quadrature transformation on the extended delay profile and transforms the delay profile to channel estimation values of a frequency domain.

According to this configuration, a delay profile of a range equal to or larger than a maximum delay time that is created from a pilot segment is extended and transformed to channel estimation values, so that it is possible to perform fine calculation of channel estimation values approximate to the actual channel state on the frequency axis, and, as a result, improve the accuracy of frequency equalization using the channel estimation values, for example.

The receiving apparatus according to a fourteenth aspect of the present invention employs a configuration wherein, in the above-described thirteenth aspect, the creating section has: a channel estimating section that performs channel estimation using the pilot segment; and an inverse quadrature transformation section that performs inverse quadrature transformation on the channel estimation result and transforms the result to a delay profile.

According to this configuration, a channel estimation result based on a pilot segment is subjected to inverse quadrature transformation and the result is transformed to a delay profile, so that it is possible to efficiently create a delay profile with a small amount of processing.

The receiving apparatus according to a fifteenth aspect of the present invention employs a configuration wherein, in the above-described thirteenth aspect, the creating section creates a delay profile by taking the correlation of time waveforms between the pilot segment and the pilot data.

According to this configuration, a delay profile is created from the correlation of the time waveform of the pilot segment, so that it is possible to increase the accuracy of the delay profile when the autocorrelation of known pilot data is low.

The receiving apparatus according to a sixteenth aspect of the present invention employs a configuration wherein, in the above-described thirteenth aspect, the creating section has: a filter that generates a replica of the pilot segment by delaying and multiplying the pilot data by coefficients; a comparing section that calculates a difference between the generated replica and an actual pilot segment; and a coefficient correcting section that corrects the filter coefficients so as to minimize the calculated difference, and, when the difference is minimized, the filter outputs the coefficients as a delay profile.

According to this configuration, the FIR coefficients when the accuracy of the replica of the pilot segment is highest are set as the delay profile, so that it is possible to generate a more accurate delay profile in a short period of time by setting, for example, the initial values of the coefficients of FIR based on channel estimation values obtained by other methods.

The receiving apparatus according to a seventeenth aspect of the present invention has a plurality of receiving antennas and performs MIMO communication, the receiving apparatus employing a configuration having: a receiving section that receives a signal having a mixture of a plurality of streams where a plurality of information symbols follow a pilot symbol comprised of pilot data of a known and invariant pattern, from a plurality of receiving antennas; a calculating section that calculates per combination of the stream and the receiving antenna, a channel estimation value of each frequency corresponding to a time length which is equal to or longer than the pilot segment, using a pilot segment of each stream corresponding to the pilot symbol; a removing section that removes delay waves included in the information symbol segments of each stream corresponding to the plurality of information symbols using the calculated channel estimation values; and a generating section that demodulates an information symbol segment of a stream having the highest reception quality out of the undemodulated streams and generates a reception replica using a delay wave removal result corresponding to the stream, wherein the removing section subtracts a generated reception replica from a received signal and removes delay waves included in the information symbol segments of streams other than the stream having the highest reception quality.

According to this configuration, delay waves included in the information symbol segments of each stream are removed using channel estimation values, a reception replica of the information symbols of the stream having the highest reception quality is generated using the delay wave removal result corresponding to that stream, the reception replica is subtracted from the received signal, and the delay waves included in the information symbol segments are removed again. As a result, delay waves are sequentially removed from the stream having good reception quality, so that it is possible to accurately demultiplex streams and remove delay wave components.

The radio communication system according to an eighteenth aspect of the present invention has a transmitting apparatus and a receiving apparatus, wherein: the transmitting apparatus has: a first generating section that generates a plurality of information symbols from information data; a second generating section that generates a pilot symbol from pilot data of a known and invariant pattern; and a transmitting section that transmits a signal having a frame configuration where the plurality of information symbols follow the pilot symbol; and the receiving apparatus has: a receiving section that receives a signal having the frame configuration; an estimating section that performs channel estimation using a pilot segment corresponding to the pilot symbol; an interpolating section that interpolates the channel estimation results on a frequency axis and obtains channel estimation values; and a removing section that removes delay waves included in information symbol segments corresponding to the plurality of information symbols using the obtained channel estimation values.

According to this configuration, the transmitting apparatus transmits a signal having a frame configuration where a plurality of information symbols follow a pilot symbol, and a receiving apparatus obtains through interpolation channel estimation values for an information symbol segment located between pilot symbols and removes delay waves, so that it is possible to suppress intersymbol interference even without guard intervals, and further reduce the ratio of redundant components in a signal and improve the transmission efficiency without adding guard intervals.

The radio communication method according to a nineteenth aspect of the present invention is a radio communication method of a radio communication system having a transmitting apparatus, the radio communication method having the steps of: at the transmitting apparatus: generating a plurality of information symbols from information data; generating a pilot symbol from pilot data of a known and invariant pattern; and transmitting a signal having a frame configuration where the plurality of information symbols follow the pilot symbol; and at the receiving apparatus: receiving a signal of the frame configuration; performing channel estimation using a pilot segment corresponding to the pilot symbol; interpolating the channel estimation results on a frequency axis and obtaining channel estimation values; and removing delay waves included in information symbol segments corresponding to the plurality of information symbols using the obtained channel estimation values.

According to this method, the transmitting apparatus transmits a signal having a frame configuration where a plurality of information symbols follow a pilot symbol, and a receiving apparatus obtains through interpolation channel estimation values for information symbol segments located between pilot symbols and removes delay waves, so that it is possible to suppress intersymbol interference even without guard intervals, and further reduce the ratio of redundant components in a signal, and improve the transmission efficiency without adding guard intervals.

The radio communication method according to a twentieth aspect of the present invention has the steps of: receiving a signal that includes a pilot symbol comprised of known pilot data; creating a delay profile of a range equal to or larger than a maximum delay time using a pilot segment corresponding to the pilot symbol; extending the created delay profile by adding a segment having an amplitude of 0 to the delay profile; and performing quadrature transformation on the extended delay profile and transforming the delay profile to channel estimation values of a frequency domain.

According to this method, a delay profile of a range equal to or larger than a maximum delay time that is created from a pilot segment is extended and transformed to channel estimation values, so that it is possible to perform fine calculation of channel estimation values approximate to the actual channel state on the frequency axis, and, as a result, improve the accuracy of frequency equalization using the channel estimation values, for example.

The radio communication method according to a twenty-first aspect of the present invention has the steps of: receiving a signal having a mixture of a plurality of streams where a plurality of information symbols follow a pilot symbol comprised of pilot data of a known and invariant pattern at a plurality of receiving antennas; calculating a channel estimation value of each frequency corresponding to a time length which is equal to or longer than the pilot segment per combination of the stream and the receiving antenna using a pilot segment of each stream corresponding to the pilot symbol; removing delay waves included in the information symbol segment of each stream corresponding to the plurality of information symbols using calculated channel estimation values; demodulating an information symbol segment of a stream having the highest reception quality out of the undemodulated streams and generates a reception replica using a delay wave removal result corresponding to the stream; and subtracting the generated reception replica from the received signal and removes delay waves included in the information symbol segments of streams other than the stream having the highest reception quality.

According to this method, delay waves included in the information symbol segment of each stream are removed using channel estimation values, a reception replica of the information symbols of the stream having the highest reception quality is generated using the delay wave removal result corresponding to that stream, the reception replica is subtracted from the received signal, and the delay waves included in the information symbol segment are removed again. As a result, delay waves are sequentially removed from the stream having good reception quality, so that it is possible to accurately demultiplex streams and remove delay wave components.

The present application is based on Japanese Patent Application No. 2005-013162 filed on Jan. 20, 2005, Japanese Patent Application No. 2005-051204, filed on Feb. 25, 2005, and Japanese Patent Application No. 2005-073366, filed on Mar. 15, 2005, the entire content of which is expressly incorporated by reference herein.

INDUSTRIAL APPLICABILITY

The transmitting apparatus, receiving apparatus, and radio communication method of the present invention are capable of suppressing intersymbol interference, further reduce the ratio of redundant components in a signal and improve the transmission efficiency, and are useful as, for example, a transmitting apparatus, receiving apparatus, and radio communication method used in a multipath environment.

The invention claimed is:

1. A transmitting apparatus comprising:
   a first generating section that generates a plurality of information symbols from information data;
   a second generating section that generates a pilot symbol from pilot data of a known and invariant pattern;
   an adding section that adds a guard interval only immediately before the pilot symbol;
   a transmitting section that transmits a signal having a frame configuration where the plurality of information symbols follow the pilot symbol to which the guard interval is added;
   a plurality of transmitting antennas; and
   a determining section that determines an arrangement pattern of a plurality of the pilot symbols where the plurality of the pilot symbols corresponding to the plurality of the transmitting antennas are orthogonal to each other,
   wherein the transmitting section transmits streams, each stream having a pilot symbol to which a guard interval is added arranged therein and the plurality of information symbols arranged following the pilot symbol, from the plurality of transmitting antennas according to the determined arrangement pattern, and
   wherein the determining section determines the arrangement pattern where, during a period in which a pilot symbol corresponding to one transmitting antenna is arranged, pilot symbols and information symbols corresponding to other transmitting antennas are not arranged.

2. The transmitting apparatus according to claim 1, wherein the first generating section comprises:
   an S/P converting section that performs S/P conversion on information data; and
   a transformation section that assigns parallel data obtained through the S/P conversion to a plurality of subcarriers having different frequencies and transforms the assigned parallel data to information symbols of a time domain.

3. The transmitting apparatus according to claim 1, wherein the first generating section inserts between the information symbols a ramping segment where an amplitude gradually increases and decreases.

4. A transmitting apparatus comprising:
a first generating section that generates a plurality of information symbols from information data;
a second generating section that generates a pilot symbol from pilot data of a known and invariant pattern;
an adding section that adds a guard interval only immediately before the pilot symbol;
a transmitting section that transmits a signal having a frame configuration where the plurality of information symbols follow the pilot symbol to which the guard interval is added;
a plurality of transmitting antennas; and
a determining section that determines an arrangement pattern of a plurality of the pilot symbols where the plurality of the pilot symbols corresponding to the plurality of the transmitting antennas are orthogonal to each other,
wherein the transmitting section transmits streams, each stream having a pilot symbol to which a guard interval is added arranged therein and the plurality of information symbols arranged following the pilot symbol, from the plurality of transmitting antennas according to the determined arrangement pattern, and
wherein, when a maximum delay time is equal to or less than a guard interval length, the determining section determines the arrangement pattern where the pilot symbols corresponding to all transmitting antennas are arranged consecutively one after the other and the plurality of information symbols are arranged following the arranged pilot symbol group.

5. The transmitting apparatus according to claim 4, wherein the first generating section comprises:
an S/P converting section that performs S/P conversion on information data; and
a transformation section that assigns parallel data obtained through the S/P conversion to a plurality of subcarriers having different frequencies and transforms the assigned parallel data to information symbols of a time domain.

6. The transmitting apparatus according to claim 4, wherein the first generating section inserts between the information symbols a ramping segment where an amplitude gradually increases and decreases.

7. The transmitting apparatus according to claim 4, wherein the determining section further determines the arrangement pattern where, during a period in which a pilot symbol corresponding to one transmitting antenna is arranged, pilot symbols and information symbols corresponding to other transmitting antennas are not arranged.

8. A transmitting apparatus comprising:
a first generating section that generates a plurality of information symbols from information data;
a second generating section that generates a pilot symbol from pilot data of a known and invariant pattern;
an adding section that adds a guard interval only immediately before the pilot symbol;
a transmitting section that transmits a signal having a frame configuration where the plurality of information symbols follow the pilot symbol to which the guard interval is added;
a plurality of transmitting antennas; and
a determining section that determines an arrangement pattern of a plurality of the pilot symbols where the plurality of the pilot symbols corresponding to the plurality of the transmitting antennas are orthogonal to each other,
wherein the transmitting section transmits streams, each stream having a pilot symbol to which a guard interval is added arranged therein and the plurality of information symbols arranged following the pilot symbol, from the plurality of transmitting antennas according to the determined arrangement pattern, and
wherein, when a maximum delay time exceeds a guard interval length, the determining section determines the arrangement pattern where a pilot symbol or a non-transmission period corresponding to the same transmitting antenna is arranged before the plurality of information symbols and immediately before the closest pilot symbol.

9. The transmitting apparatus according to claim 8, wherein the first generating section comprises:
an S/P converting section that performs S/P conversion on information data; and
a transformation section that assigns parallel data obtained through the S/P conversion to a plurality of subcarriers having different frequencies and transforms the assigned parallel data to information symbols of a time domain.

10. The transmitting apparatus according to claim 8, wherein the first generating section inserts between the information symbols a ramping segment where an amplitude gradually increases and decreases.

11. The transmitting apparatus according to claim 8, wherein the determining section further determines the arrangement pattern where, during a period in which a pilot symbol corresponding to one transmitting antenna is arranged, pilot symbols and information symbols corresponding to other transmitting antennas are not arranged.

\* \* \* \* \*